(12) United States Patent
Ferris et al.

(10) Patent No.: US 8,186,633 B2
(45) Date of Patent: *May 29, 2012

(54) COUPLER FOR CABLE TROUGH

(75) Inventors: Matthew D. Ferris, Carver, MN (US); Timothy J. Haataja, Prior Lake, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 282 days.

This patent is subject to a terminal disclaimer.

(21) Appl. No.: 12/039,933

(22) Filed: Feb. 29, 2008

(65) Prior Publication Data

US 2008/0298884 A1 Dec. 4, 2008

Related U.S. Application Data

(62) Division of application No. 11/619,636, filed on Jan. 4, 2007, now Pat. No. 7,360,743, which is a division of application No. 10/772,950, filed on Feb. 4, 2004, now Pat. No. 7,175,137, which is a division of application No. 09/991,382, filed on Nov. 16, 2001, now Pat. No. 6,709,186.

(51) Int. Cl.
*F16L 3/22* (2006.01)

(52) U.S. Cl. ......... 248/68.1; 248/49; 403/293; 403/325; 403/109.3

(58) Field of Classification Search ............... 248/48.1, 248/49, 68.1, 222.12, 212.13; 403/109.3, 403/293, 294, 321, 325, 328; 385/134, 136; 52/220.5

See application file for complete search history.

(56) References Cited

U.S. PATENT DOCUMENTS

| 2,316,166 A | 4/1943 | Huguelet |
| 2,360,159 A | 10/1944 | Peck |
| 2,741,499 A | 4/1956 | Kussmaul |
| 2,821,154 A | 1/1958 | Tennison, Jr. |
| 2,823,056 A | 2/1958 | Di Meo et al. |
| 2,834,622 A | 5/1958 | Reeves |
| 2,891,750 A | 6/1959 | Bergquist |

(Continued)

FOREIGN PATENT DOCUMENTS

DE 3636412 A1 4/1988

(Continued)

OTHER PUBLICATIONS

Exhibit A, DITEL, Inc.; DITEL UPL-1000/UPT-1000/Corner Cable Guides; product information, 2 pages, © 1986.

(Continued)

*Primary Examiner* — Tan Le
(74) *Attorney, Agent, or Firm* — Merchant & Gould P.C.

(57) ABSTRACT

Couplers for a cable trough system including a spacing defined by first and second guiding surfaces, the spacing being sized to receive the terminal end of a trough member into the spacing. One or more springs are carried on the couplers and may be at least partially disposed within the spacing between the first and the second guiding surfaces. The springs urge the terminal end of the trough member against the coupler upon insertion of the terminal end into the spacing. One or more locking elements are coupled adjacent to the springs to move between a locking position and a released position. The locking elements may slide longitudinally or move perpendicularly to the couplers. A first trough member may be released from the couplers independent from a second trough member coupled to the couplers. Methods for use of the couplers are also provided.

7 Claims, 25 Drawing Sheets

U.S. PATENT DOCUMENTS

| | | | | |
|---|---|---|---|---|
| 3,022,972 | A | 2/1962 | Bunston | |
| 3,042,351 | A | 7/1962 | Du Bois | |
| 3,351,699 | A | 11/1967 | Merckle | |
| 3,370,121 | A | 2/1968 | Merckle | |
| 3,457,598 | A | 7/1969 | Mariani | |
| 3,471,629 | A | 10/1969 | O'Leary | |
| 3,493,917 | A | 2/1970 | Glowacz | |
| 3,603,625 | A | 9/1971 | Cottrell et al. | |
| 3,782,420 | A | 1/1974 | Kolb et al. | |
| 3,875,618 | A | 4/1975 | Schuplin | |
| 3,915,420 | A | 10/1975 | Norris | |
| 4,023,697 | A * | 5/1977 | Marrero | 220/3.4 |
| 4,099,749 | A | 7/1978 | van Vliet | |
| 4,305,236 | A | 12/1981 | Williams | |
| 4,854,665 | A | 8/1989 | Gagnon | |
| 4,954,015 | A | 9/1990 | McGowan | |
| 5,035,092 | A | 7/1991 | Brant | |
| 5,038,528 | A | 8/1991 | Brant | |
| 5,067,678 | A | 11/1991 | Henneberger et al. | |
| 5,078,530 | A | 1/1992 | Kim | |
| 5,100,221 | A | 3/1992 | Carney et al. | |
| 5,134,250 | A | 7/1992 | Caveney et al. | |
| 5,142,606 | A | 8/1992 | Carney et al. | |
| 5,161,580 | A | 11/1992 | Klug | |
| 5,316,243 | A | 5/1994 | Henneberger | |
| D348,651 | S | 7/1994 | Henneberger | |
| 5,469,893 | A | 11/1995 | Caveney et al. | |
| 5,720,567 | A | 2/1998 | Rinderer | |
| 5,752,781 | A | 5/1998 | Haataja et al. | |
| 5,753,855 | A | 5/1998 | Nicoli et al. | |
| 5,792,993 | A | 8/1998 | Rinderer | |
| D402,262 | S | 12/1998 | Scherer et al. | |
| D402,263 | S | 12/1998 | Scherer et al. | |
| 5,924,260 | A | 7/1999 | Austin et al. | |
| D413,306 | S | 8/1999 | Scherer et al. | |
| 5,995,699 | A | 11/1999 | Vargas et al. | |
| 5,998,732 | A | 12/1999 | Caveney et al. | |
| D419,962 | S | 2/2000 | Caveney | |
| 6,037,543 | A | 3/2000 | Nicoli et al. | |
| D430,543 | S | 9/2000 | Rohder | |
| 6,143,984 | A | 11/2000 | Auteri | |
| 6,188,024 | B1 | 2/2001 | Benito-Navazo | |
| 6,193,434 | B1 * | 2/2001 | Durin et al. | 403/329 |
| D447,737 | S | 9/2001 | Scherer et al. | |
| 6,402,418 | B1 | 6/2002 | Durin et al. | |
| 6,424,779 | B1 | 7/2002 | Ellison et al. | |
| 6,450,458 | B1 | 9/2002 | Bernard | |
| 6,454,485 | B2 | 9/2002 | Holcomb et al. | |
| 6,476,327 | B1 | 11/2002 | Bernard et al. | |
| 6,512,875 | B1 | 1/2003 | Johnson et al. | |
| 6,520,192 | B1 | 2/2003 | Lo | |
| 6,523,791 | B2 | 2/2003 | Bernard et al. | |
| 6,634,825 | B2 | 10/2003 | Tolkoff et al. | |
| 6,709,186 | B2 * | 3/2004 | Ferris et al. | 403/293 |
| 6,715,719 | B2 * | 4/2004 | Nault et al. | 248/68.1 |
| 7,029,195 | B2 * | 4/2006 | Nault et al. | 403/293 |
| 7,093,997 | B2 * | 8/2006 | Ferris et al. | 403/293 |
| 7,175,137 | B2 * | 2/2007 | Ferris et al. | 248/49 |
| 7,246,778 | B2 | 7/2007 | Caveney et al. | |
| 7,360,743 | B2 * | 4/2008 | Ferris et al. | 248/49 |
| 7,463,809 | B2 * | 12/2008 | Beck | 385/134 |
| 7,614,817 | B2 * | 11/2009 | Nault et al. | 403/293 |
| 2002/0006312 | A1 | 1/2002 | Buard | |
| 2002/0096606 | A1 | 7/2002 | Bernard et al. | |
| 2003/0147690 | A1 | 8/2003 | Ronnquist | |
| 2008/0298884 | A1 * | 12/2008 | Ferris et al. | 403/293 |

FOREIGN PATENT DOCUMENTS

| | | |
|---|---|---|
| DE | 102 12 285 A1 | 11/2002 |
| EP | 0 315 023 A2 | 5/1989 |
| EP | 0 571 307 A1 | 11/1993 |
| EP | 0 486 442 B1 | 10/1995 |
| EP | 0 874 260 A1 | 10/1998 |
| EP | 1 033 800 A1 | 9/2000 |
| EP | 1 160 949 A2 | 12/2001 |
| EP | 1 160 950 A2 | 12/2001 |
| EP | 1 249 912 A1 | 10/2002 |
| FR | 1479341 | 3/1967 |
| GB | 549840 | 12/1942 |
| GB | 1 342 085 | 12/1973 |
| WO | 99/06746 | 2/1999 |
| WO | 00/75550 | 12/2000 |
| WO | 02/18991 | 3/2002 |
| WO | 02/31939 A1 | 4/2002 |
| WO | 02/33445 A2 | 4/2002 |
| WO | 02/086576 A1 | 10/2002 |

OTHER PUBLICATIONS

Exhibit B, ADC Telecommunications, Inc.; FiberGuide™, Fiber Management System, 6 pages front and back printed.

Exhibit C, Warren & Brown Technologies Pty. Ltd., Fibre Optic Management Systems, Component Selection Guide, 19 pages of product information. Source: www.warrenandbrown.com.au.

Exhibit D, Panduit Network Connectivity Group, FiberRunner™ 6x4 Routing System Product Brochure, 2 pages, © Panduit Corp. 2000.

Exhibit E, Panduit Corp. FiberRunner™ 4x4 Quiklock™ Coupler (FRBC4X4) Customer Drawing, 1 page, Jul. 13, 2001.

Exhibit F, Panduit Corp. FiberRunner™ 6x4 Quiklock™ Coupler (FRBC6X4) Customer Drawing, 1 page, May 10, 2000.

Exhibit G, Panduit Corp. FiberRunner™ 12x4 Quiklock™ Coupler (FRBC12X4) Customer Drawing, 1 page, Jan. 3, 2001.

Exhibits H-M, Photographs of various Panduit products.

* cited by examiner

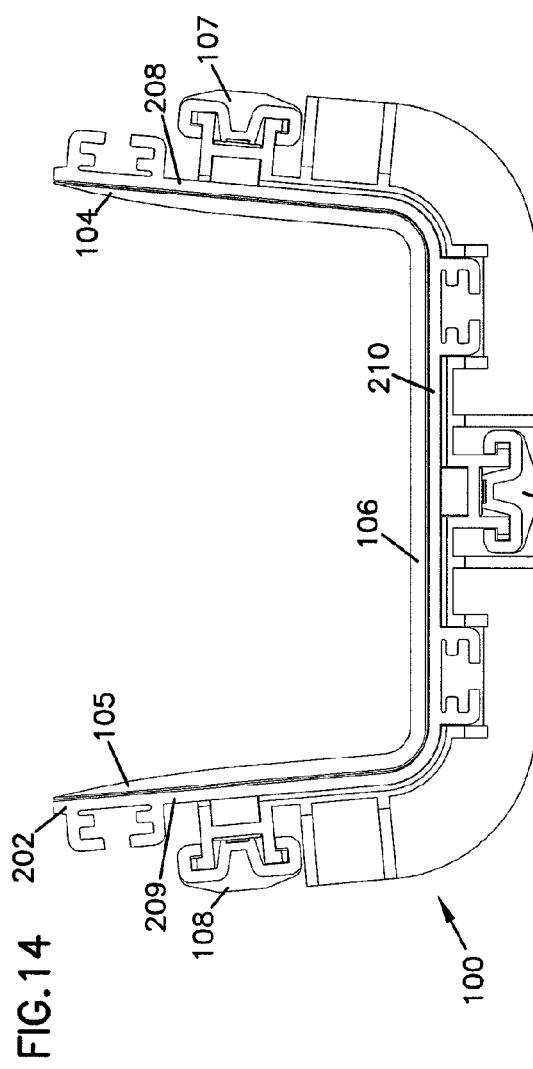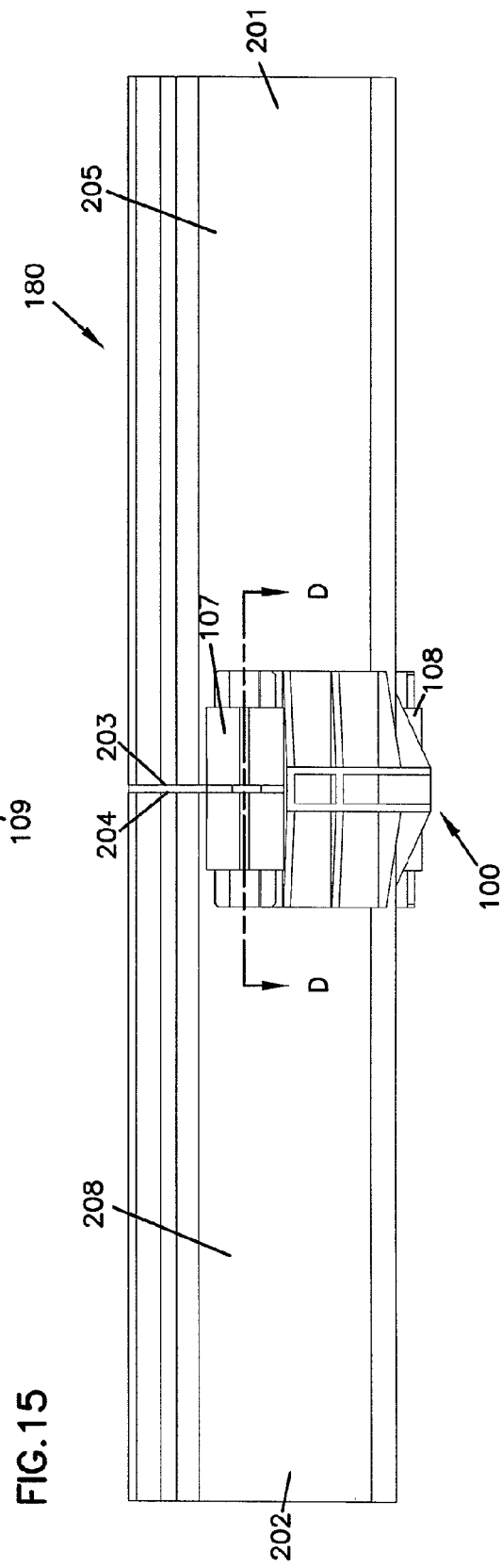

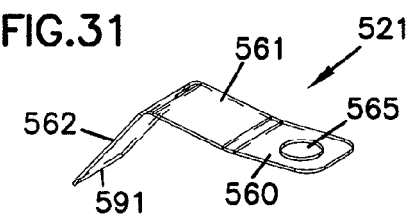
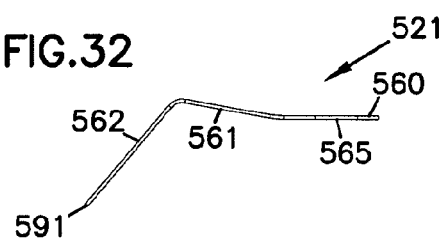
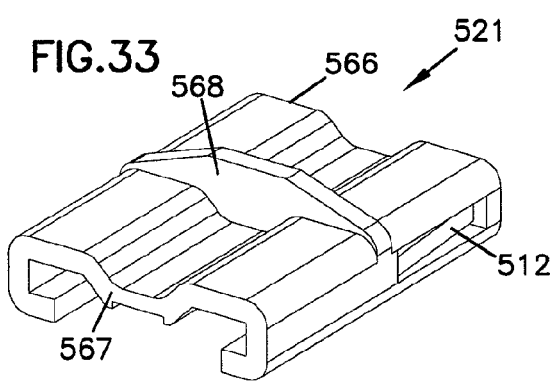
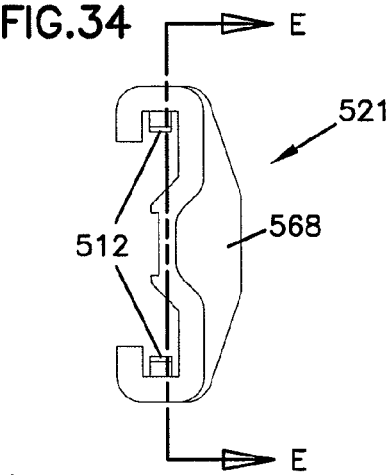
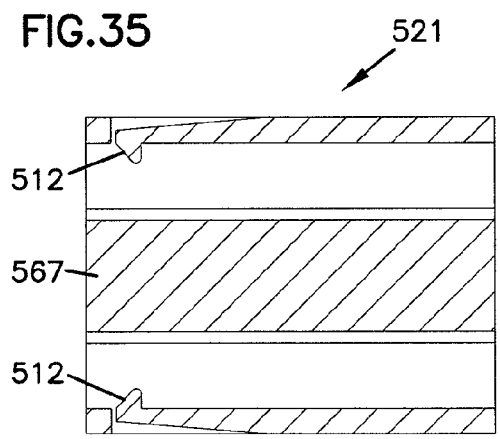
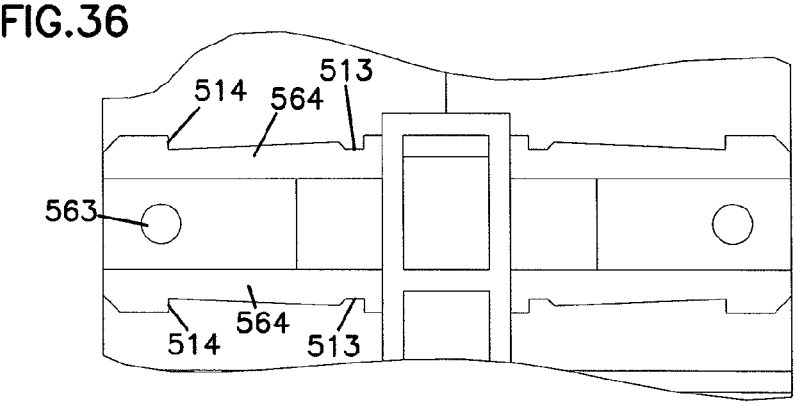

COUPLER FOR CABLE TROUGH

TECHNICAL FIELD

The present invention relates to a system for the management and routing of telecommunication cables, and, more particularly, to a coupler for joining two or more trough members.

BACKGROUND

In the telecommunications industry, the use of optical fibers for signal transmissions is accelerating. With the increased utilization of optical fiber systems, optical fiber cable management requires industry attention.

One area of optical fiber management that is necessary is the routing of optical fibers from one piece of equipment to another. For example, in a telecommunications facility, optical fiber cables may be routed between fiber distribution equipment and optical line terminating equipment. In buildings and other structures that carry such equipment, the cable routing can take place in concealed ceiling areas or in any other manner to route cables from one location to another.

When routing optical fibers and other cables such as copper wires, it is desirable that a routing system will be readily modifiable and adaptable to changes in equipment needs. Accordingly, such routing systems include a plurality of components, such as trough members and couplers, for defining the cable routing paths. The trough members are joined together by couplings. U.S. Pat. Nos. 5,067,678, 5,316,243, and 5,752,781 all teach cable routing systems that include a plurality of trough members and couplers.

Various concerns arise in the use of couplers for coupling trough members. One concern is that a plurality of hardware is used for joining the trough members. This hardware can be cumbersome. Further, there is sometimes a need to rearrange or change the trough members and couplers. It is desirable to provide couplers that can be disconnected.

SUMMARY

A coupler for a cable trough system according to one aspect of the invention may include a body having a body terminal end defining an overlap region, the overlap region being sized to slideably receive a terminal end of a trough member along a longitudinal direction of the trough member, a spring positioned to selectively engage the terminal end of the trough member, and a slide carried on the body for moving the spring between a locking position and a release position, the slide moveable in the longitudinal direction.

According to another aspect of the invention, a coupler for a cable trough system including a trough member having a terminal end may include a body having an open end and including first and second guiding surfaces defining a spacing, the spacing being sized to receive the terminal end, with the first guiding surface slideably engageable with an internal wall surface of the terminal end and with the second guiding surface slideably engageable with an external wall surface of the terminal end, a spring carried on the body and directed to push the terminal end against the body upon insertion of the terminal end into the spacing; and a locking element carried on the body, wherein the locking element is slidingly coupled to the body to slide between a first sliding position wherein the spring engages the terminal end within the spacing and a second sliding position wherein the spring is released to allow the terminal end to be removed from the spacing defined by the body, the locking element being slideable in a direction parallel to the first and second guiding surfaces.

In accordance with another aspect of the invention, a coupler for a cable trough system including trough members having a terminal end with first and second side walls joined at lower edges by a bottom wall and where the side walls and the bottom wall have a wall thickness separating internal and external wall surfaces may include a body including first and second guiding surfaces defining a spacing, the spacing being sized to receive the wall thickness inserted into the spacing in a longitudinal direction and having an unobstructed open end for admitting the terminal end into the spacing with the first guiding surface slideably engageable with the internal wall surface of the terminal end and with the second guiding surface slideably engageable with the external wall surface of the terminal end, the first guiding surface having a generally U-shaped configuration including first and second side wall portions joined at lower edges by a bottom wall portion, and the second guiding surface at least partially surrounding the first and second side wall portions and the bottom wall portion of the first guiding surface, a plurality of springs positioned to urge the terminal end against the body upon insertion of the terminal end into the spacing, and a plurality of moveable locking elements carried on the body, wherein each locking element of the plurality of locking elements is slidingly coupled to the body to slide in the longitudinal direction between a first sliding position wherein a respective spring of the plurality of springs engages the terminal end within the spacing and a second sliding position wherein the respective spring is released to allow the terminal end to be removed from the spacing of the coupler.

In accordance with yet another aspect of the invention, a method for using a coupler and a first trough member may include the steps of: providing a terminal end of the first trough member coupled to the coupler, wherein the terminal end was inserted in a longitudinal direction into a spacing defined by the coupler; sliding a locking element on the coupler parallel to the longitudinal direction to release a spring from a locking position; and removing the terminal end of the first trough member from the spacing so that the terminal end slides past the spring.

Another aspect of the invention may include a coupler for a cable trough system including first and second trough members having terminal ends, the coupler including a body having open ends and including first and second guiding surfaces defining a first spacing in a first half of the body and a second spacing in a second half of the body, the terminal end of the first trough member being inserted into the first spacing in a longitudinal direction and the terminal end of the second trough member being inserted into the second spacing in the longitudinal direction, and a releasable spring mechanism disposed on the body adjacent the first guiding surface, wherein the releasable spring mechanism includes a first portion that engages the terminal end of the first trough member and a second portion that engages the terminal end of the second trough member, and wherein the first portion of the releasable spring mechanism is released independently of the second portion to release the terminal end of the first trough member while maintaining engagement of the second portion with the terminal end of the second trough member.

Another aspect of the invention may include a coupler for a cable trough system including a body having a body terminal end defining an overlap region, the overlap region being sized to slideably receive a terminal end of a trough member along a longitudinal direction of the trough member between a first and a second guiding surface of the body, a spring positioned to selectively force the terminal end of the trough member, the spring including a longitudinal portion coupled at an end to an arm portion, wherein the longitudinal portion extends from the end in the longitudinal direction towards the body terminal end, and wherein the arm portion extends at an angle in relation to the longitudinal portion towards the first guiding surface and away from the body terminal end, and a locking element carried on the body for positioning the spring, the locking element being coupled to the spring and the body at a point between the arm portion of the spring and the body terminal end, and wherein the locking element is moveable perpendicular to the longitudinal direction between a locking position and a release position.

In accordance with another aspect of the invention, a coupler for a cable trough system may include a body having a body terminal end defining an overlap region, the overlap region being sized to slideably receive a terminal end of a trough member along a longitudinal direction of the trough member between a first and a second guiding surface of the body, a spring positioned to selectively force the terminal end of the trough member, the spring including a longitudinal portion coupled at an end to an arm portion, wherein the longitudinal portion extends from the end in the longitudinal direction towards the body terminal end, and wherein the arm portion extends at an angle in relation to the longitudinal portion towards the first guiding surface and away from the body terminal end, and a locking element carried on the body for positioning the spring, the locking element being coupled to the spring and the body at a point between the arm portion of the spring and the body terminal end, and wherein the locking element is moveable perpendicular to the longitudinal direction between a locking position and a release position.

In accordance with another aspect of the invention, a coupler for a cable trough system including first and second trough members having terminal ends may include a body having open ends and including first and second guiding surfaces defining a first spacing in a first half of the body and a second spacing in a second half of the body, the terminal end of the first trough member being inserted into the first spacing in a longitudinal direction and the terminal end of the second trough member being inserted into the second spacing in the longitudinal direction, a first spring portion coupled to the body, a second spring portion coupled to the body, and means for selectively releasing the first or second spring portion from engagement with the first or second trough member while maintaining engagement of the other with the first or second trough member.

In accordance with yet another aspect of the invention, a coupler for a cable trough system including first and second trough members having terminal ends may include a body having open ends and including first and second guiding surfaces defining a first spacing in a first half of the body and a second spacing in a second half of the body, the terminal end of the first trough member being inserted into the first spacing in a longitudinal direction and the terminal end of the second trough member being inserted into the second spacing in the longitudinal direction, a first spring portion coupled to the body, a second spring portion coupled to the body, a first locking element coupled adjacent to the first spring portion, and a second locking element coupled adjacent to the second spring portion, wherein the first locking element pushes the first spring portion against the first trough member and the second locking element pushes the second spring portion against the second trough member, and wherein the first spring portion and associated first locking element are released to release the first trough member while maintaining engagement of the second spring portion and the associated second locking element with the second trough member.

Another aspect according to the invention may include a method for use of a coupler and a trough system including first and second trough members, the method including the steps of: providing a terminal end of the first trough member coupled to the coupler and a terminal end of the second trough member coupled to the coupler, wherein the terminal ends were inserted in a longitudinal direction into first and second spacings defined by the coupler, wherein the first trough member is held to the coupler with a first spring portion, and wherein the second trough member is held to the coupler with a second spring portion; releasing the first spring portion to release the terminal end of the first trough member without releasing the terminal end of the second trough member; and removing the terminal end of the first trough member from the first spacing.

In another aspect of the invention, a method for use of a coupler and a trough system including first and second trough members may including the steps of: providing a terminal end of the first trough member coupled to the coupler and a terminal end of the second trough member coupled to the coupler, wherein the terminal ends were inserted in a longitudinal direction into first and second spacings defined by the coupler; releasing a plurality of first locking elements on the coupler in a direction perpendicular to the longitudinal direction to release a plurality of first springs from a locking position to release the terminal end of the first trough member without releasing the terminal end of the second trough member; and removing the terminal end of the first trough member from the first spacing so that the terminal end of the first trough member slides past the first plurality of springs.

BRIEF DESCRIPTION OF THE DRAWINGS

FIGS. 14-17 are front, side, top, and bottom views, respectively, of the coupler and trough members of FIG. 13.

FIGS. 31 and 32 are perspective and side views, respectively, of the spring shown in FIG. 30.

FIGS. 33 and 34 are perspective and side views, respectively, of the locking element shown in FIG. 30.

FIG. 35 is a cross-sectional view taken along line E-E of the locking element shown in FIG. 34.

FIG. 36 is a portion of the coupler of FIG. 25 illustrating the outer side wall portion with the locking element removed in accordance with the present invention.

DETAILED DESCRIPTION OF THE PREFERRED EMBODIMENT

Figure 1:
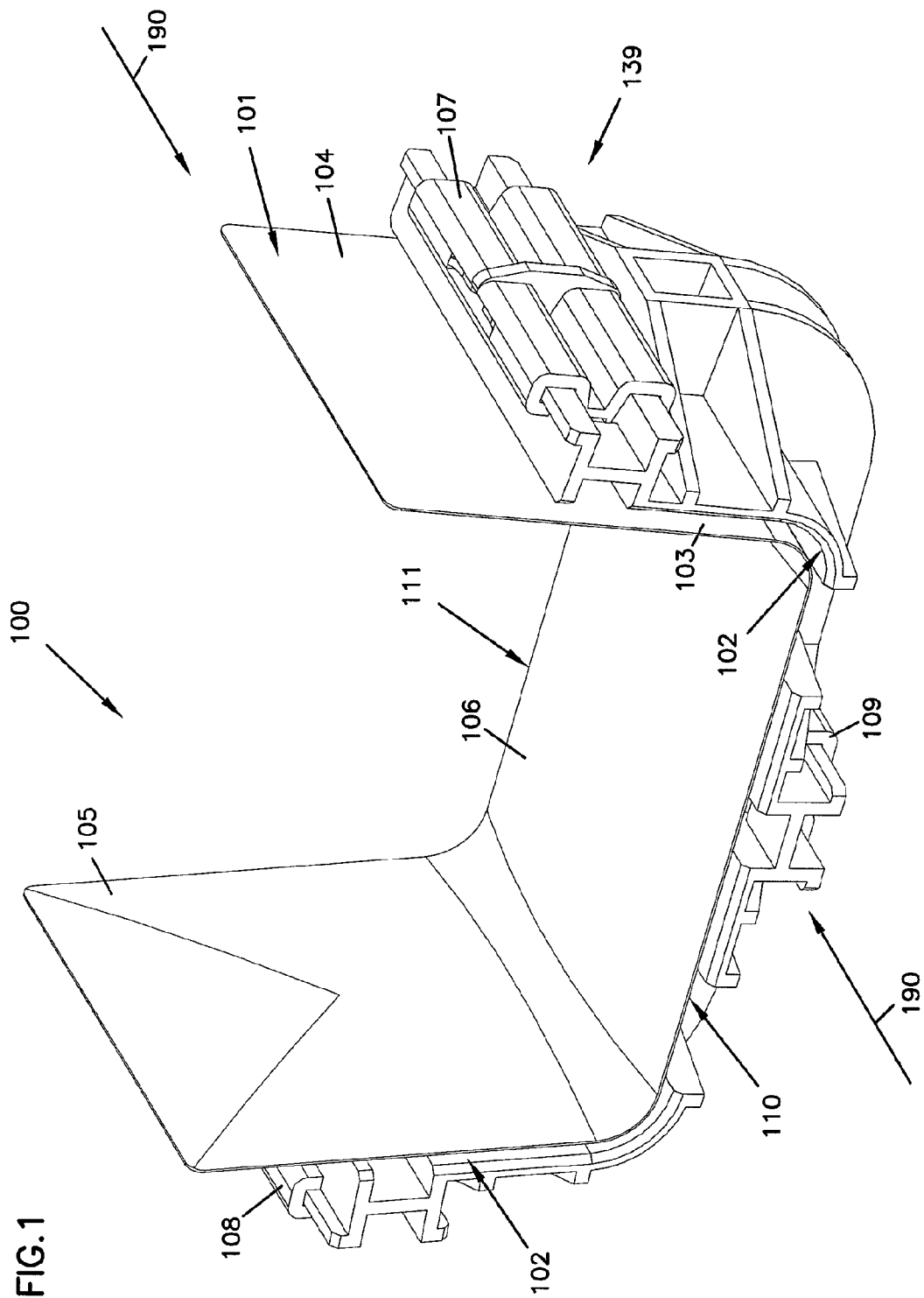
FIG. 1 is a perspective view of an embodiment of a coupler in accordance with the present invention.
Figure 3:
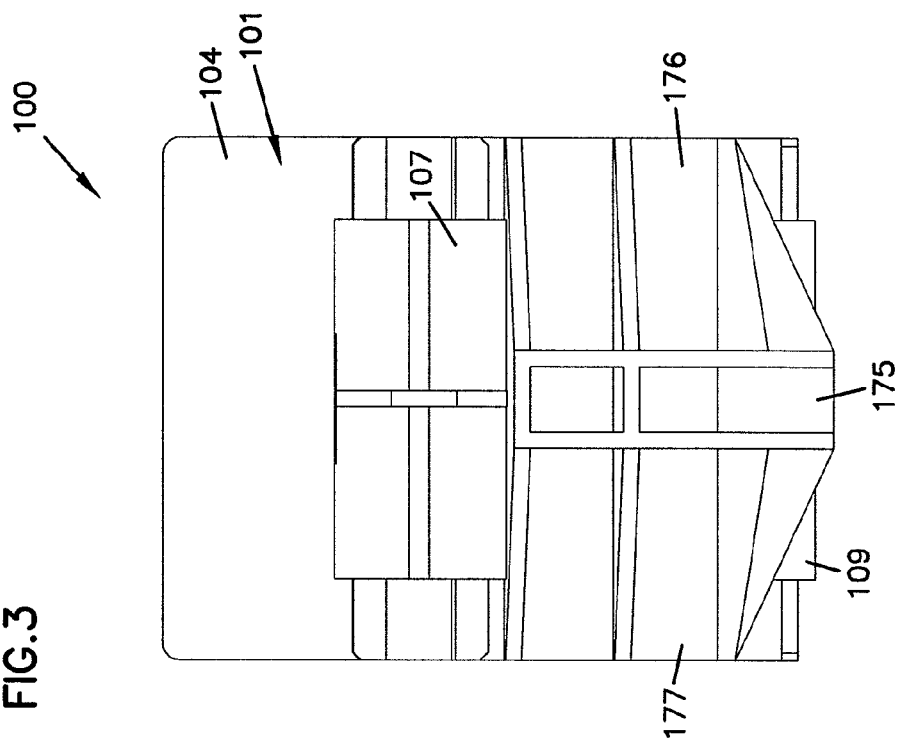
FIGS. 2-5 are front, side, top, and bottom views, respectively, of the coupler shown in FIG. 1.
Figure 2:
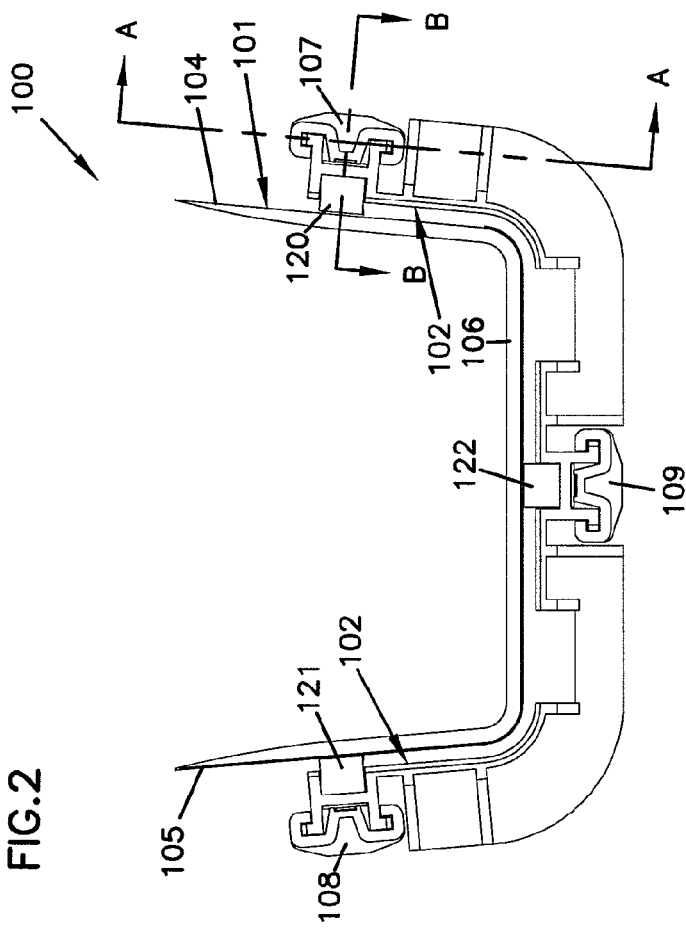
Figure 4:
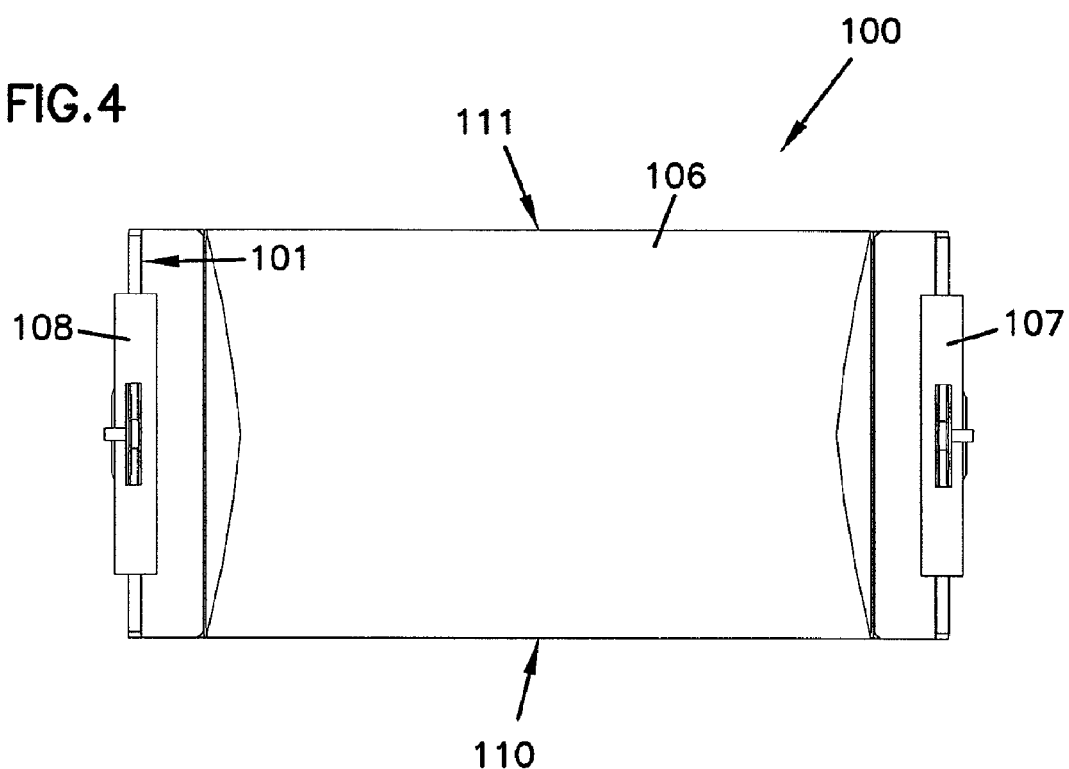
Figure 5:
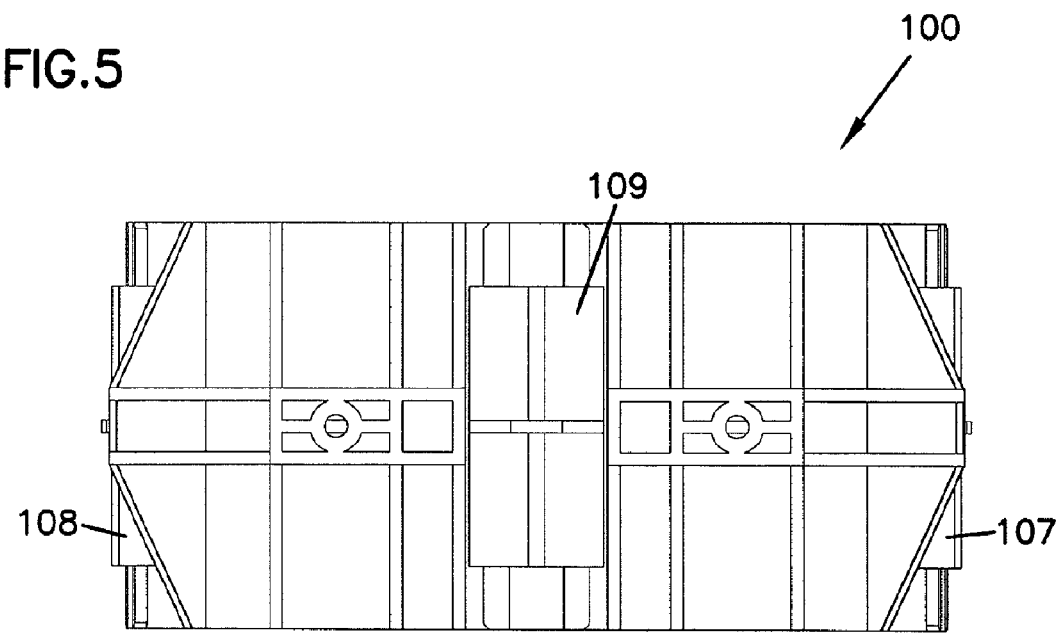

Referring now to FIGS. 1-5, a coupler 100 is provided in accordance with an example embodiment of the present invention. The coupler 100 includes a first guiding surface 101 and a second guiding surface 102 at least partially surrounding the first guiding surface 101, as well as a first coupler end 110 and a second coupler end 111. A spacing 103 is defined between the first guiding surface 101 and the second guiding surface 102. The spacing 103 is sized to receive a trough member (see trough members 201 and 202 of FIGS. 13-18) or other system component inserted into the spacing 103 in a longitudinal direction 190.

A releasable spring mechanism 139 releasably mounts the coupler 100 to a trough member at each end 110 and 111. Preferably, the spring mechanism 139 can be activated or locked during insertion of a trough member end into one of the coupler ends 110 and 111. At the desired time, the spring mechanism 139 is released to allow decoupling of the coupler 100 and the trough member.

The first guiding surface 101 of the coupler 100 is generally U-shaped, including a first side wall portion 104 and a second side wall portion 105, as well as a bottom wall portion 106 joining the first and second side wall portions 104 and 105. The second guiding surface 102 is also U-shaped, includes a midpoint or midsection 175 dividing the coupler 100 into first and second halves 176 and 177, and generally surrounds at least a portion of the first guiding surface 101.

First and second springs 120 and 121 of the releasable spring mechanism 139 are generally disposed adjacent to the first and second side wall portions 104 and 105 in the spacing 103. It is not necessary that the entirety of the first and second springs 120 and 121 be contained within the spacing 103. In fact, the springs 120 and 121 may, but need not, completely clear the spacing 103 when in an unlocked position. When in a locked position, a portion of the springs 120 and 121 may partially enter the spacing 103 to push against a trough member inserted into the spacing 103. In addition, as is shown in this embodiment, a third spring 122 is disposed adjacent to the bottom wall portion 106 in the spacing 103.

First, second, and third locking elements 107, 108, and 109 of the releasable spring mechanism 139 are slidingly coupled to an exterior of the coupler 100. The first, second, and third locking elements 107, 108, and 109 are positioned adjacent to the first, second, and third springs 120, 121, and 122, respectively. Although the first spring 120 and the first locking element 107 are described in detail below, the second and third springs 121 and 122 and the second and third locking elements 108 and 109 have an identical structure in the illustrated embodiment.

Figure 6:
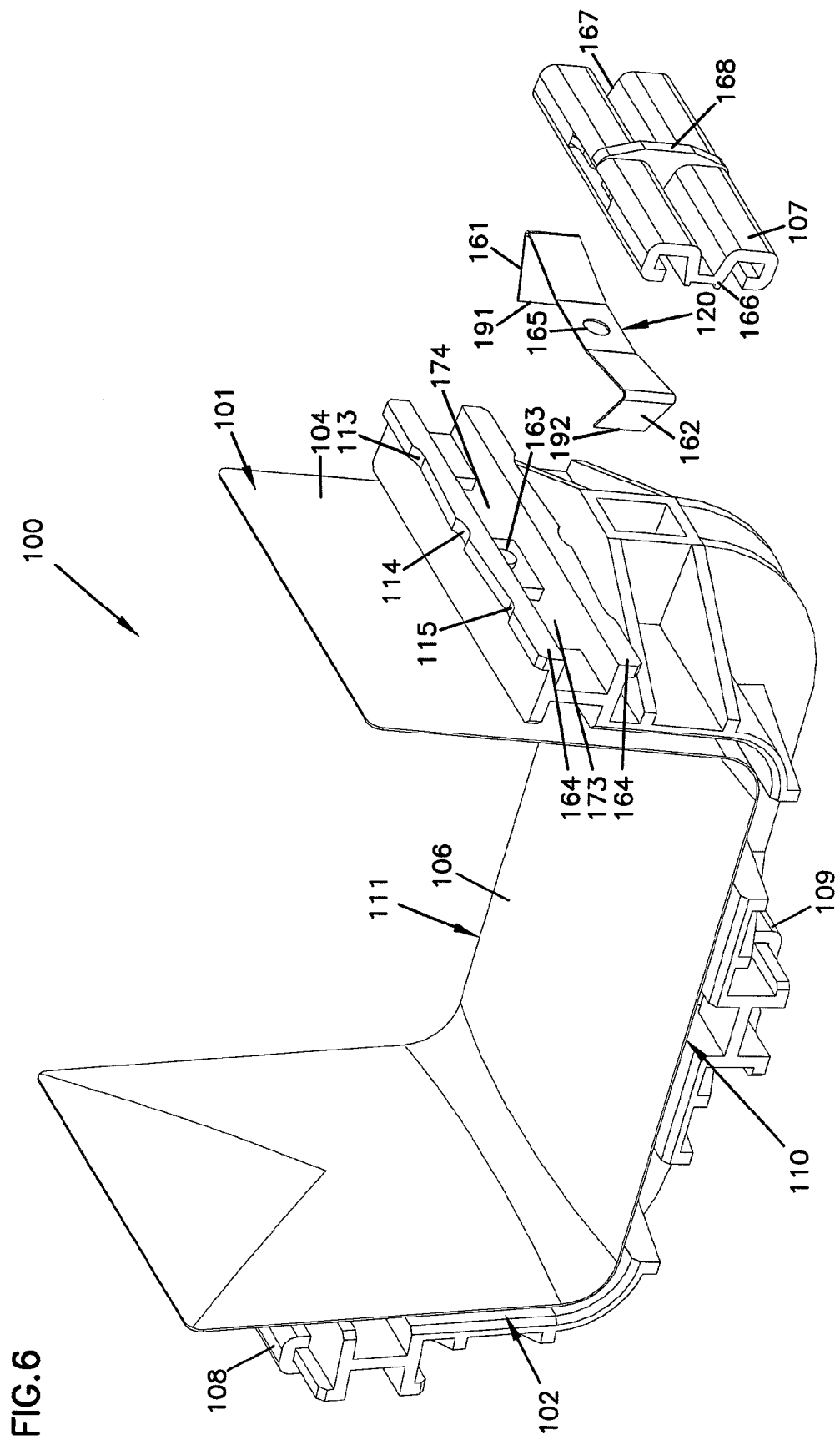
FIG. 6 is a perspective view of the coupler of FIG. 1 with one of the locking elements and springs in exploded view in accordance with the present invention.
Figure 7:
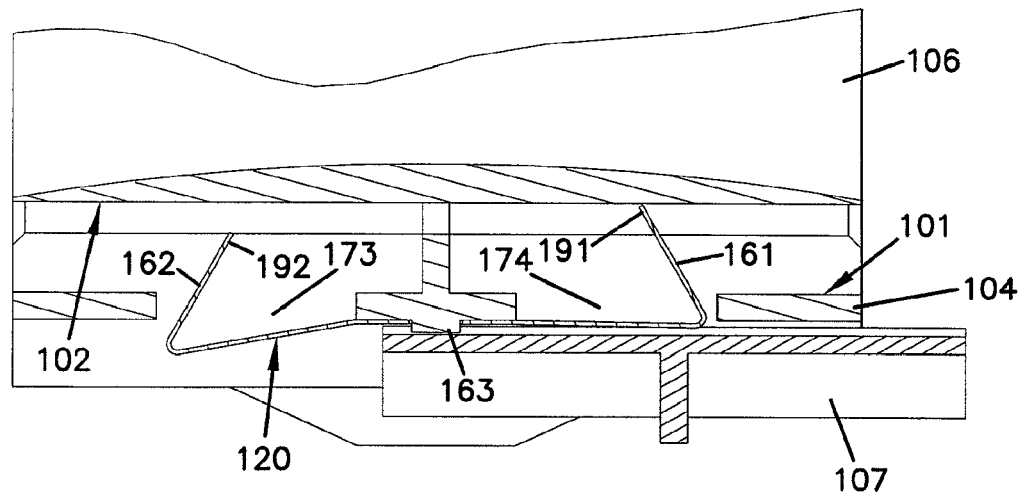
FIG. 7 is a cross-sectional top view along line B-B of FIG. 2 showing the locking element and the spring in the first sliding position.

As shown with reference to FIGS. 6 and 7, the first spring 120 comprises a longitudinal portion 160 coupled to a first arm 161 at a first end and to a second arm 162 at a second end. The first and second arms 161 and 162 engage, force, push, urge, or are biased against a trough member inserted in the spacing 103 to couple the coupler 100 to the trough member.

In the example embodiment, the first and second arms 161 and 162 extend from the longitudinal portion 160 at an angle. In one example, an angle less than 90 degrees is defined between the longitudinal portion 160 and each of the arms 161 and 162. The arms 161 and 162 define projections that project at an angle to the longitudinal direction. The arms 161 and 162 project toward the interior of the spacing 103 away from the coupler ends 110 and 111 to resist pull out of the trough member from the coupler 100. Ends 191 and 192 engage trough members that are inserted into the coupler 100 and increase the hold down force as the trough members are pulled in a direction away (e.g. opposite 190) from the coupler 100. The ends 191 and 192 push down during insertion of the trough member.

The first spring 120 can take a variety of forms besides that shown in the example embodiment. Other spring configurations, and specifically springs including different bends extending at different angles, are also possible, such as those illustrated in FIGS. 19-24, described below. The springs of FIGS. 6, 7, and 19-24 exert a force on a trough member or other system component inserted in the coupler 100 to retain the component in the coupler 100.

Referring again to FIG. 6, the first spring 120 further defines an aperture 165 sized to engage a boss 163 coupled adjacent to the second guiding surface 102. After the aperture 165 defined by the first spring 120 is positioned around the boss 163 on the first guiding surface 101, the first locking element 107 is longitudinally slid over the first spring 120 to retain the first spring 120 in place.

The first locking element 107 comprises first and second ends 166 and 167. A handle portion 168 is disposed adjacent a middle of the locking element 107 between the ends 166 and 167. The first locking element 107 is slidingly coupled to the second guiding surface 102 on railways 164 to allow the first locking element 107 to slide longitudinally into first, second, and third sliding positions with respect to the first spring 120 and the second guiding surface 102. The first locking element 107 is retained in the first, second, and third sliding positions via detents 113, 114, and 115 formed at intervals along the railways 164.

Figure 11:
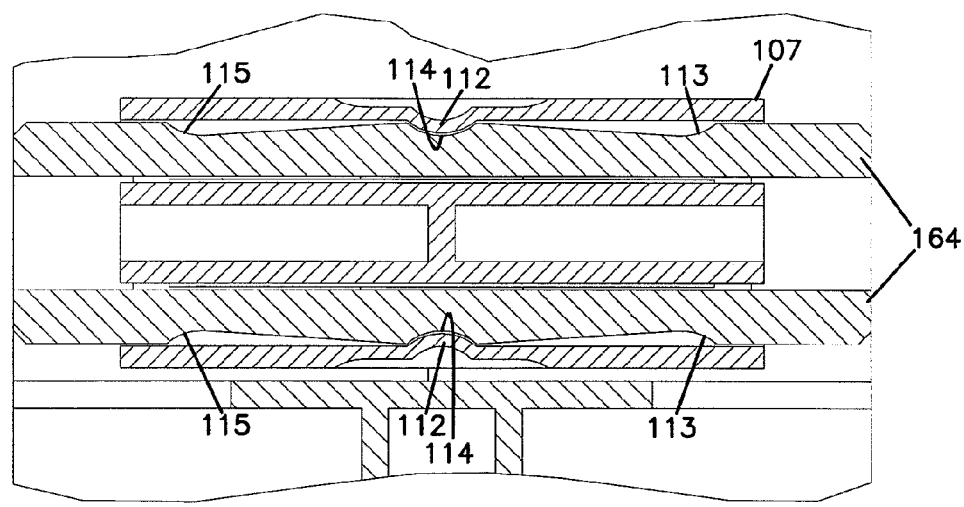
FIG. 11 is a cross-sectional view along line A-A of the locking element of FIG. 2, with the locking element positioned in the second sliding position.
Figure 12:
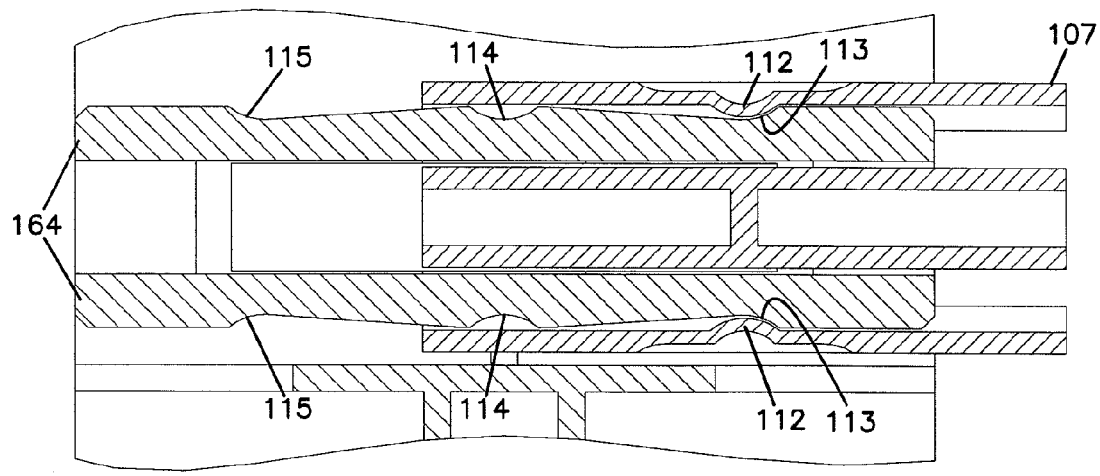
FIG. 12 is another cross-sectional view along line A-A of the locking element of FIG. 2, with the locking element positioned in the first sliding position.
Figure 13:
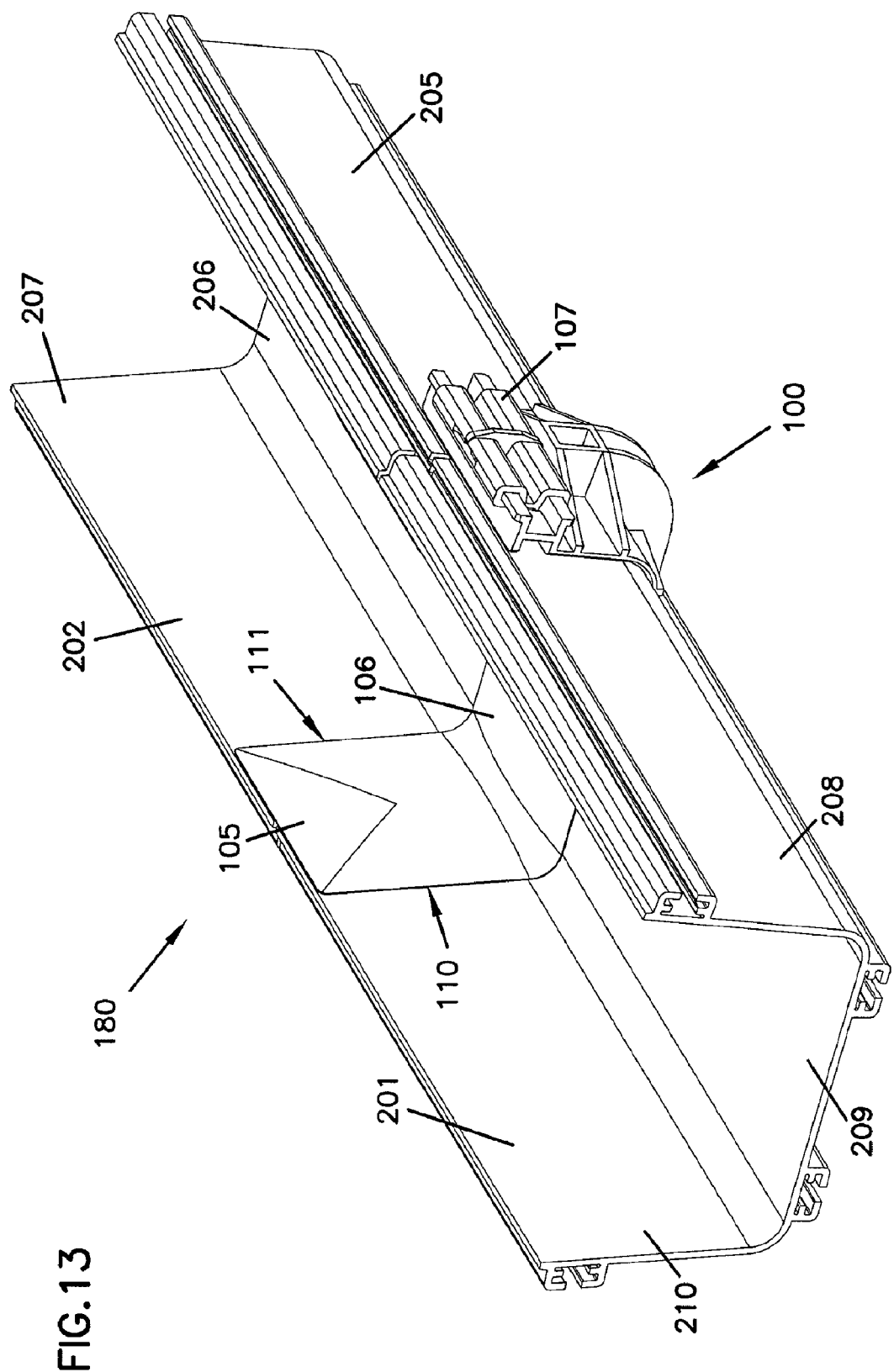
FIG. 13 is a perspective view of the coupler of FIGS. 1-12 and two trough members coupled to the coupler in accordance with the present invention.
Figure 16:
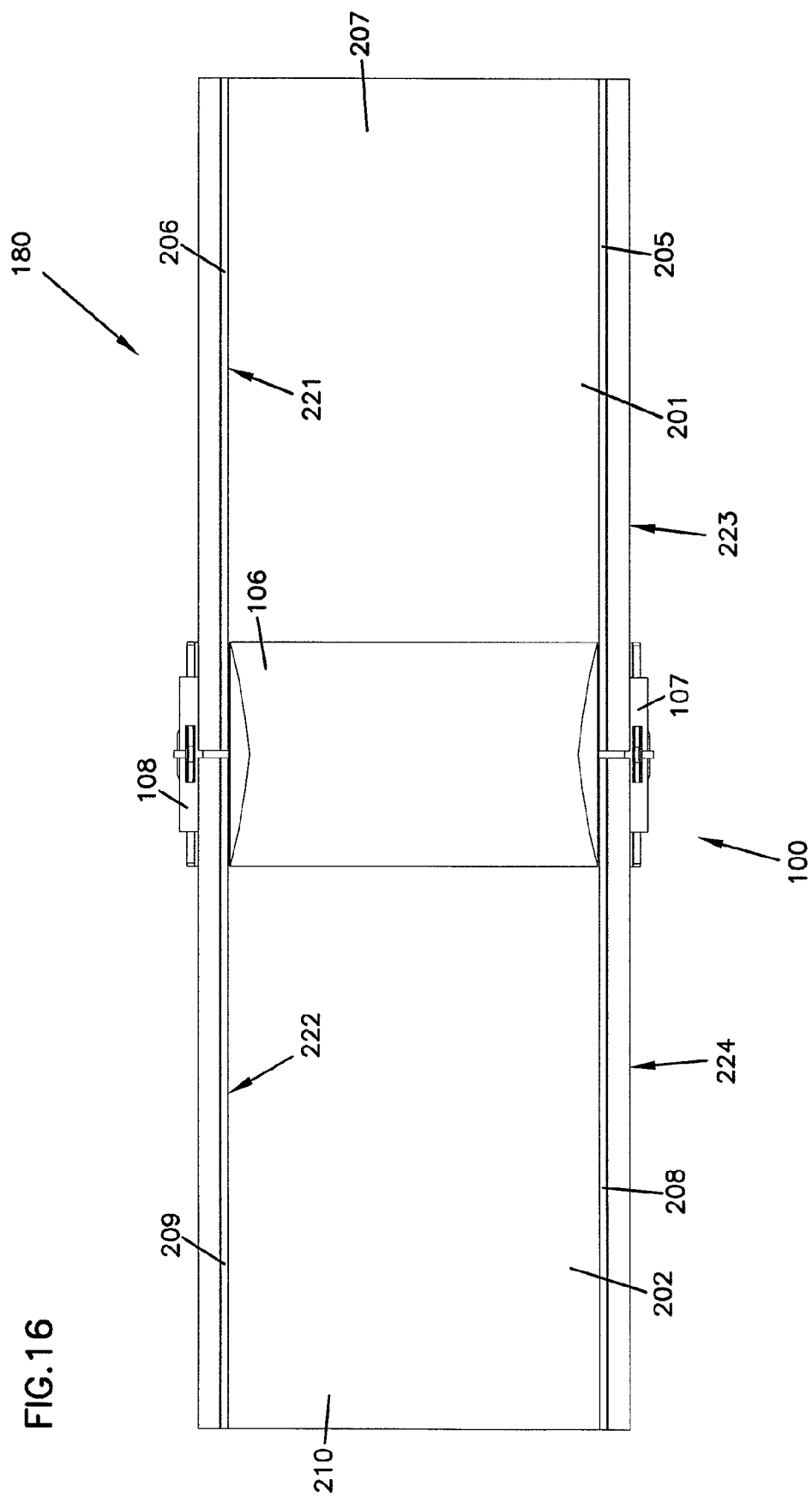
Figure 17:
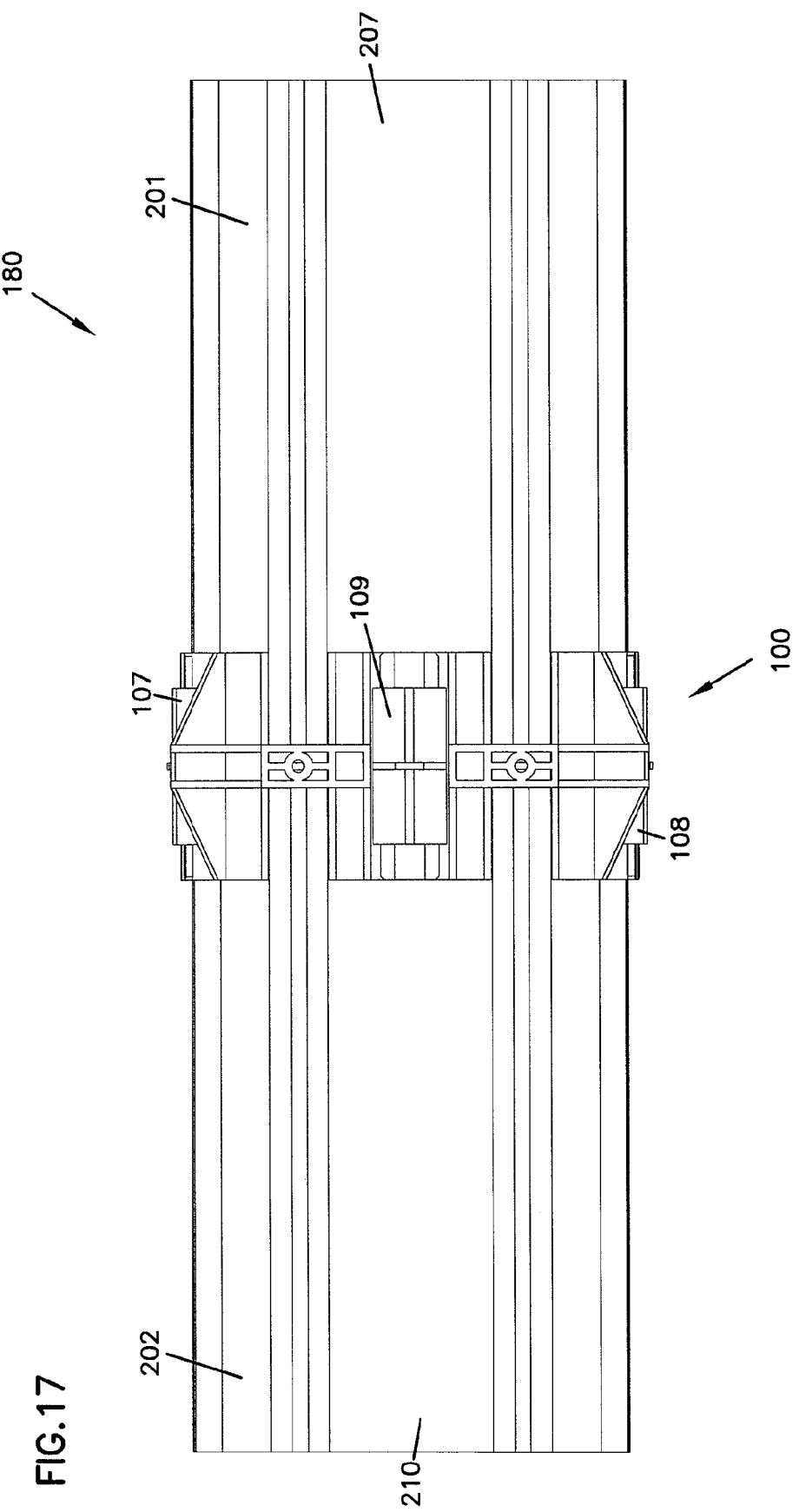

As shown in FIGS. 8-12, locking springs 112 disposed on upper and lower surfaces of the locking element 107 are positioned to engage the detents 113, 114, and 115. For example, when the locking element 107 is slid to the first sliding position shown in FIG. 12, the locking spring 112 engages detent 113 and stops the locking element 107 from sliding any farther along the railways 164, thereby preventing the locking element 107 from accidentally disengaging from the railways 164. Similarly, in the second sliding position, the locking spring 112 engages the detent 114, as shown in FIG. 11. In the third sliding position, which is the mirror image of the first sliding position shown in FIG. 12, the locking spring 112 engages the detent 115.

Figure 8:
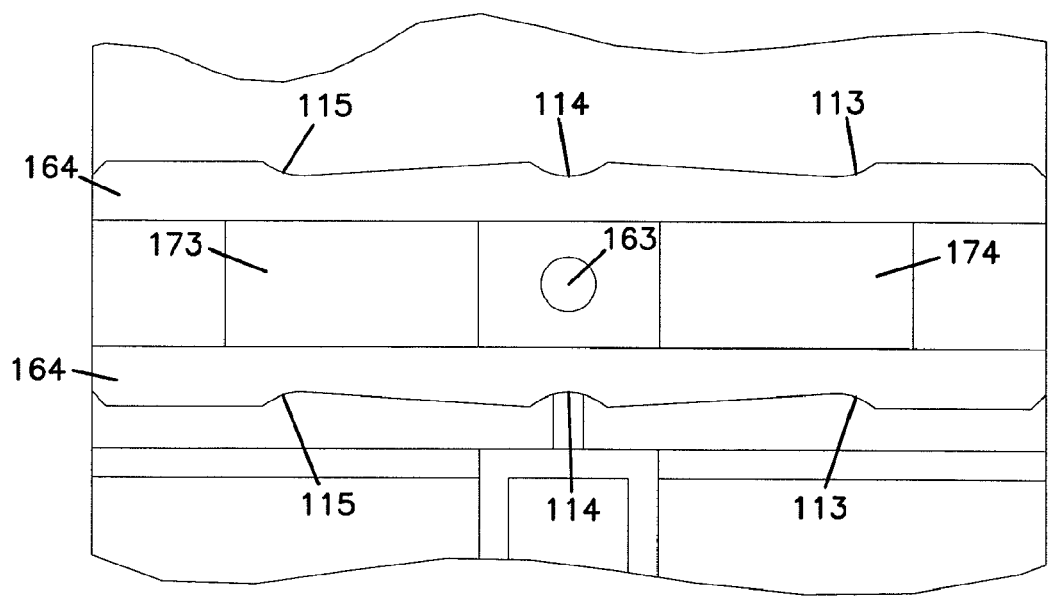
FIG. 8 is a portion of the coupler of FIG. 1 illustrating the outer side wall portion with the locking element removed in accordance with the present invention.
Figure 10:
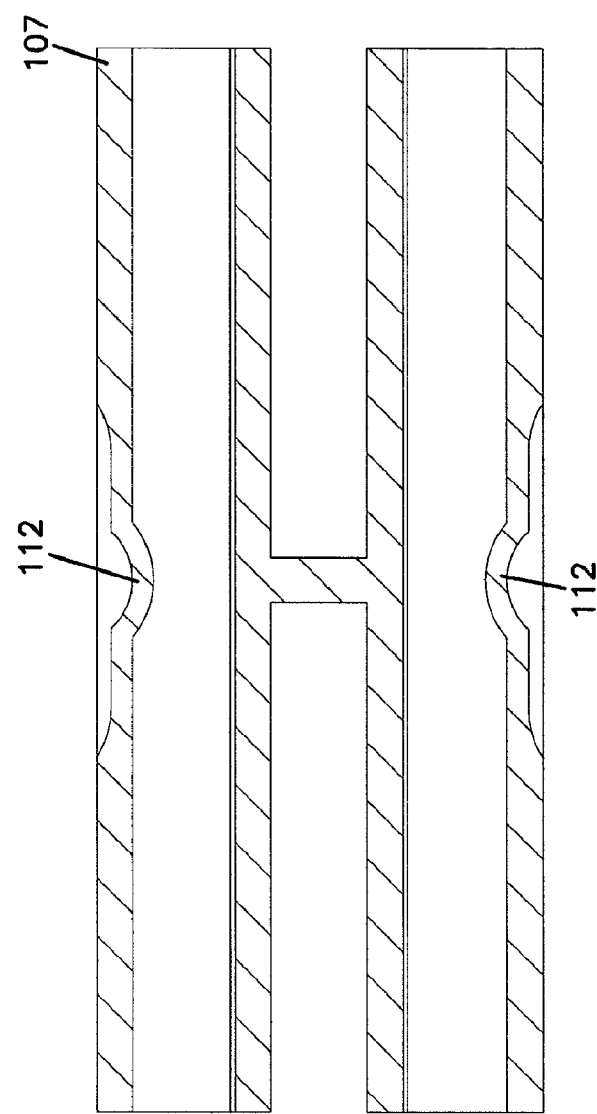
FIG. 10 is a cross-sectional view along line C-C of the locking element shown in FIG. 9.
Figure 9:
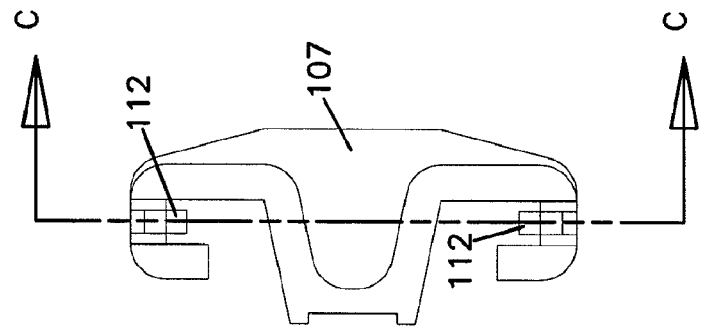
FIG. 9 is a side view of the locking element of FIG. 3.

The second guiding surface 102 further defines a first aperture 173 and a second aperture 174 adjacent to the first spring 120, as shown in FIGS. 7 and 8. The first locking element 107 is positioned to selectively cover and expose the first and second apertures 173 and 174 depending on whether the locking element 107 is in the first, second, or third sliding position. In the first sliding position, shown in FIG. 7, the locking element 107 is positioned to cover the second aperture 174 and to expose the first aperture 173. In this manner, the first arm 161 of the first spring 120 engages the first side wall portion 104 of the first guiding surface 101, while the second arm 162 is released and allowed to partially retract into the first aperture 173.

In the second sliding, or locked, position (shown in FIG. 13), the locking element 107 is positioned to cover both the first and second apertures 173 and 174, thereby urging both the first and second arms 161 and 162 toward the first side wall portion 104 of the first guiding surface 101. In this position both of the angled arms 161 and 162 project to provide the resistive force against pull out.

In the third sliding position (the mirror image of that shown in FIG. 7), the second arm 162 of the first spring 120 engages the first guiding surface 101 of the coupler 100, while the first arm 161 is released and allowed to partially retract into the second aperture 174. The second and third locking elements 108 and 109 and the second and third springs 121 and 122 function in a similar manner to that of the first locking element 107 and the first spring 120.

Referring now to FIGS. 13-18, an embodiment of a trough system 180 is shown including the coupler 100 as well as first and second trough members 201 and 202 in accordance with the present invention. The first and second trough members 201 and 202 are generally U-shaped and comprise, respectively, terminal ends 203 and 204, first side walls 205 and 208, second side walls 206 and 209, bottom walls 207 and 210, internal surfaces 221 and 222, and external surfaces 223 and 224. The trough members 201 and 202 can also take the form of other system components, such as T-fittings, downspouts, or elbows, as desired.

As illustrated, the terminal ends 203 and 204 of the trough members 201 and 202 may be slidingly engaged in the spacing 103 between the first and second guiding surfaces 101 and 102 of the coupler 100. In other words, the thickness of the walls of each of the trough members 201 and 202, or the distance between the inner surfaces 221 and 222 and the outer surfaces 223 and 224, are sized to fit within the spacing 103 of the coupler 100. The coupler 100 overlaps the terminal ends of each of the trough members to form the coupling.

Figure 18:
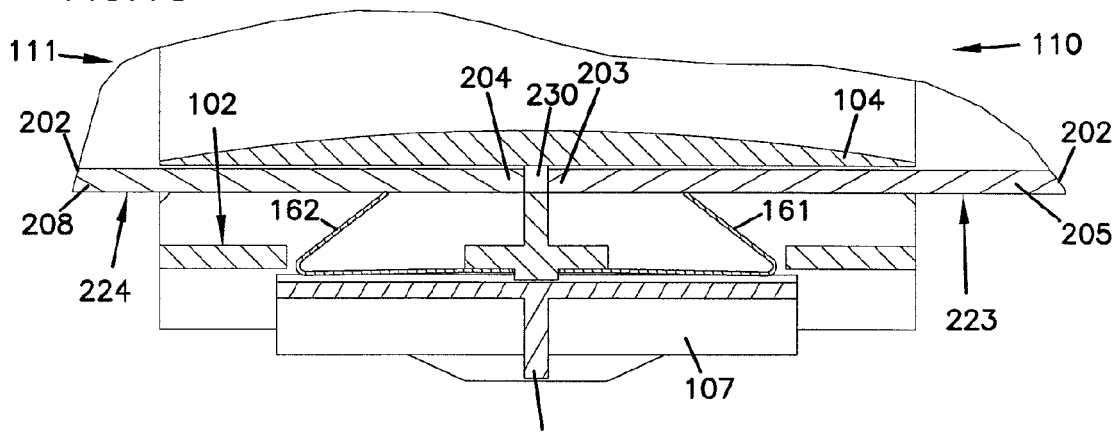
FIG. 18 is a cross-section top view along line D-D of FIG. 15 showing a portion of the coupler and the trough members with the locking element and spring in the second sliding position.

As illustrated in FIG. 18, with the first trough member 201 placed within the spacing 103 of the coupler 100, the first spring 120 is pushed by the first locking element 107. The first arm 161 of the first spring 120 pushes against the external wall surface 223 of the terminal end 203 of the first trough member 201, urging the internal surface 221 against the first guiding surface 101 of the coupler 100. Likewise, with the second trough member 202 placed within the spacing 103 on the second coupler end 111 of the coupler 100, the second arm 162 of the first spring 120 pushes against the external wall surface 224 of the terminal end 204 of the second trough member 202, urging the internal surface 222 against the first guiding surface 101 of the coupler 100. In this manner, the terminal ends 203 and 204 of the trough members 201 and 202 may be retained within the first and second coupler ends 110 and 111 of the coupler 100. The first and second arms 161 and 162 resist pull out of the trough members 201 and 202. The ends 191 and 192 grip the trough members and are forced into the trough members 201 and 202, due to their angled shape, to resist pull out.

An example method for coupling one or more trough members to the coupler 100 in accordance with the present invention is as follows. The locking elements 107, 108, and 109 may be slid to the second sliding position so that the locking elements 107, 109, and 109 are all in engagement with the springs 120, 121, and 122. Ends 191 and 192 do not interfere with insertion of the trough members 201 and 202 due to their angled shape. The angled shape is angled toward the direction of insertion of the terminal end of the trough member.

With the locking elements 107, 108, and 109 in the second sliding, or locked, position, the terminal end 203 of the first trough member 201 is then inserted into the spacing 103 between the first and second guiding surfaces 101 and 102. The terminal end 203 is inserted until the terminal end 203 passes the springs 120, 121, and 122 and abuts a trough stop 230 disposed within the spacing 103. In this position, the first arms 161 of the springs 120, 121, and 122 engage the external wall surface 223 of the first trough member 201, thereby pushing the internal wall surface 222 against the first guiding surface 101 to lock the first trough member 201 into the coupler 100. Pull out is resisted by the angled shape of the arms 161 and 162 and the ends 191 and 192 digging into the trough members 201 and 202. The second trough member 202 may be coupled to the second coupler end 111 of the coupler 100 in a similar manner.

An example method of removing the first trough member 201 in accordance with the present invention includes sliding the locking elements 107, 108, and 109 to the first sliding position to release the first arms 161 of the springs 120, 121, and 122 and then removing the terminal end 203 of the first trough member 201 from within the spacing 103 of the coupler 100. The second trough member 202 may be removed in a similar fashion.

Figure 19:
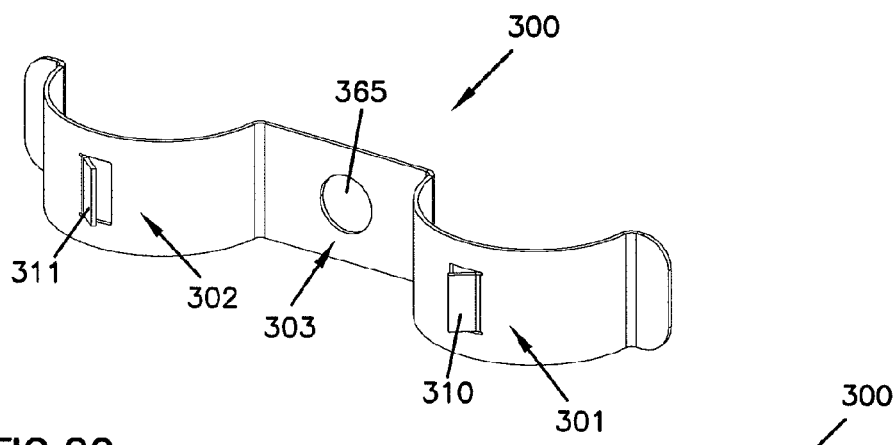
FIGS. 19-21 are perspective, front, and top views, respectively, of a first alternative embodiment of a spring in accordance with the present invention.
Figure 20:
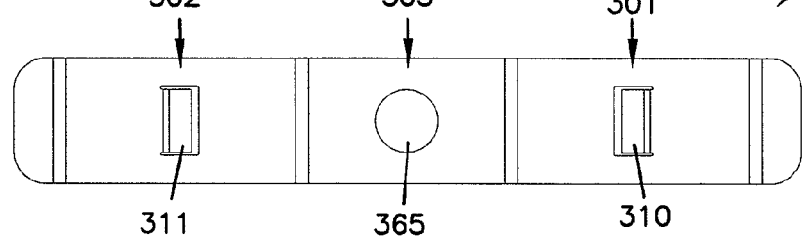
Figure 21:
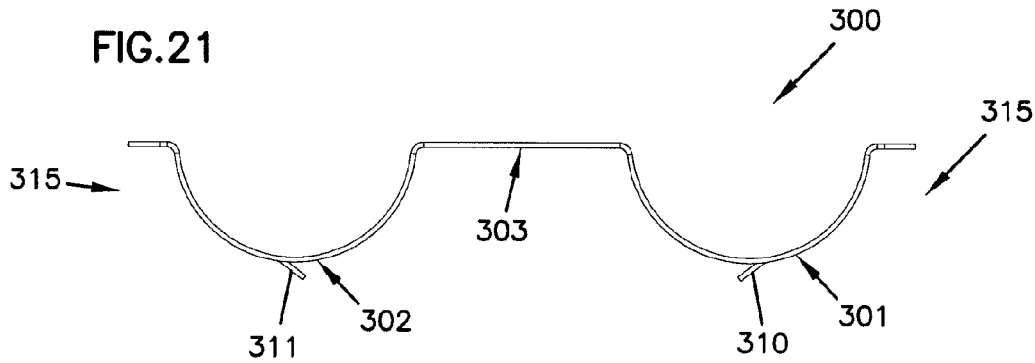

A first alternative embodiment of a spring 300 in accordance with the invention is shown in FIGS. 19-21. The spring 300 may be positioned and functions similarly to the springs 120, 121, and 122 described above. The spring 300 comprises a longitudinal portion 303 defining an aperture 365 sized to engage a boss such as 163 provided above. The spring 300 further includes a first crescent portion 301 and a second crescent portion 302 coupled to either end of the longitudinal portion 303. At the apex of each of the first and second crescent portions 301 and 302 are projections 310 and 311, positioned to extend generally at an angle in the direction of the longitudinal portion 303. The first and second crescent portions 301 and 302 push a trough member against a wall of a coupler, and the projections 310 and 311 grab the trough member should a force be exerted on the trough member in a direction to remove it. Ends 315 of the spring 300 are bent at an angle with respect to the longitudinal portion 303.

Figure 22:
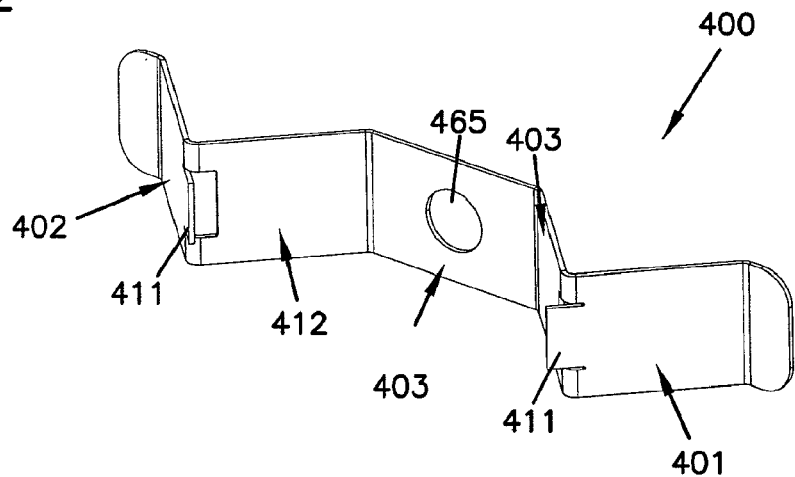
FIGS. 22-24 are perspective, front, and top views, respectively, of a second alternative embodiment of a spring in accordance with the present invention.
Figure 23:
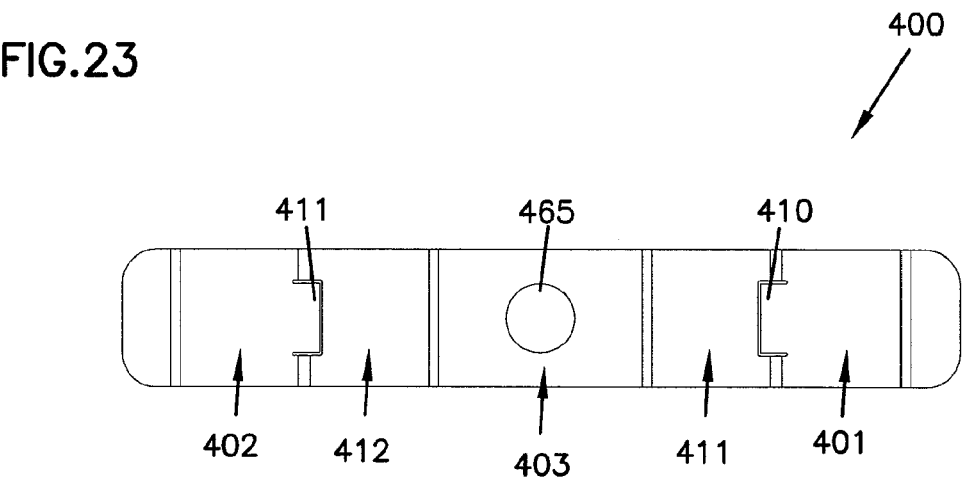
Figure 24:
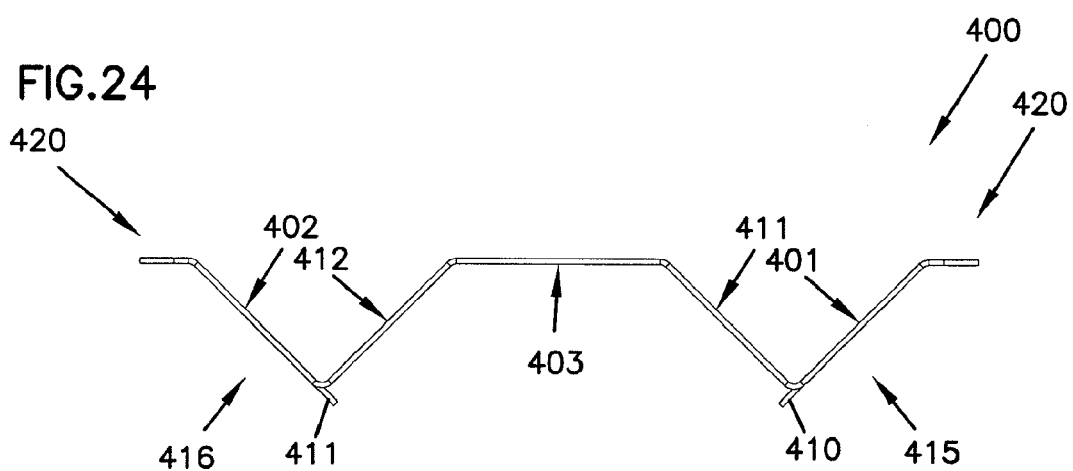
Figure 25:
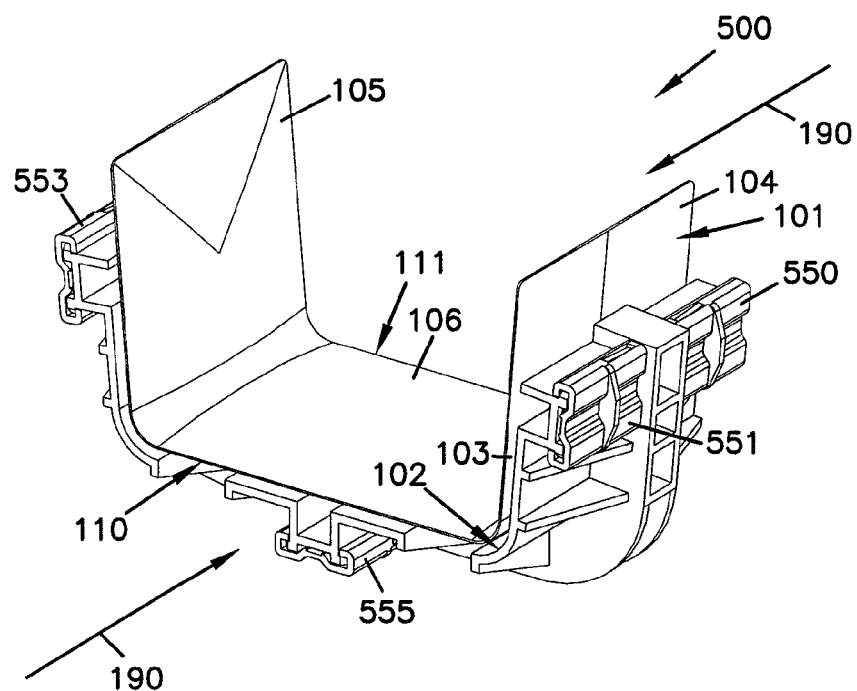
FIG. 25 is a perspective view of a second embodiment of a coupler in accordance with the present invention.

A second alternative embodiment of a spring 400 in accordance with the invention is shown in FIGS. 22-24. The spring 400 may be positioned and functions similarly to the springs 120, 121, and 122 described above. The spring 400 comprises longitudinal portion 403 defining an aperture 465 sized to engage a boss such as 163 provided above. The spring 400 further includes a first angled portion 415 comprising legs 401 and 411 and a second angled portion 416 comprising legs 402 and 412. At the apex of each of the first and second angled portions 415 and 416 are projections 410 and 411, positioned to extend generally at an angle in the direction of the longitudinal portion 403. The first and second angled portions 415 and 416 push a trough member against a wall of a coupler, and the projections 410 and 411 grab the trough member should a force be exerted on the trough member in a direction to remove it. Ends 420 of the spring 400 are bent at an angle with respect to the longitudinal portion 403.

Similarly to the springs 120, 121, and 122 described above, the springs 300 and 400 may be utilized in conjunction with locking elements such as 107, 108, and 109 to selectively push trough members against a wall of a coupler and to further release trough members to allow for the trough members to be removed from the coupler. It should be understood that additional springs of differing shapes could also be used without departing from the scope of the invention.

In a second example embodiment according to the invention, a coupler 500 is shown in FIGS. 25-30. In this embodiment, features identical to those found in the coupler 100 are given identical reference numerals. Instead of a single locking element disposed on each side and bottom of the coupler as shown in coupler 100, the coupler 500 includes first locking elements 550 and 551 with first springs 520 and 521 disposed adjacent the first side wall portion 104, second locking elements 552 and 553 with second springs 522 and 523 disposed adjacent the second side wall portion 105, and third locking elements 554 and 555 with third springs 524 and 525 disposed adjacent the bottom wall portion 106. Each of the first locking elements 550 and 551 are independently moveable, as are the second locking elements 552 and 553 and the third locking elements 554 and 555.

The first, second, and third locking elements are slidingly coupled to an exterior of the coupler 100. Although the first locking elements 550 and 551 with springs 520 and 521 are described in detail below, it should be understood that the second locking elements 552 and 553 with springs 522 and 523 and the third locking elements 554 and 555 with springs 524 and 525 have identical structures.

Figure 30:
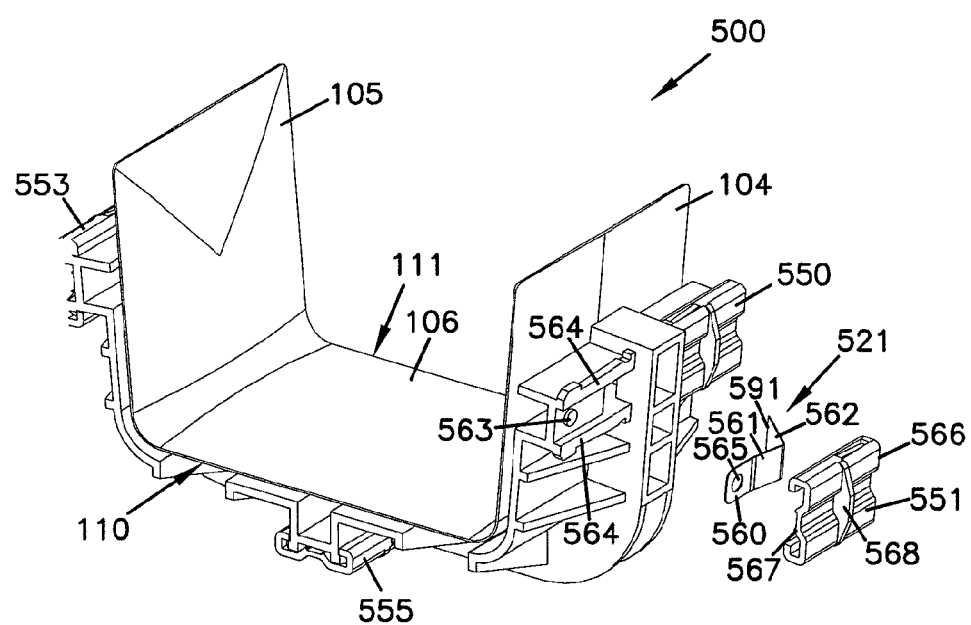
FIG. 30 is a perspective view of the coupler of FIG. 25 with one of the locking elements and springs in exploded view in accordance with the present invention.

As shown with reference to FIGS. 30-32, the first spring 521 comprises a longitudinal portion 560 coupled to a first arm 561, which in turn is coupled to a second arm 562. In the example embodiment, the first and second arms 561 and 562 extend from the longitudinal portion 560 at an angle. In the example illustrated, the first arm 561 projects at angle with respect to the longitudinal portion 560 away from the first side wall portion 104. The second arm 562 is also at an angle with respect to the first arm 561 so that the second arm 562 projects towards the first side wall portion 104 of the coupler 500. An end 591 engages the trough members and increases the hold down force as the trough members are pulled in a direction away (i.e. opposite 190) from the coupler 100. The end 191 pushes down during insertion of the trough member. Other angles and shapes are also possible to provide the resistance to pull out.

The first spring 520 further defines an aperture 565 sized to engage a boss 563 coupled adjacent to the second guiding surface 102. The locking element 551 holds the first spring 521 to the boss 563. After the aperture 565 defined by the first spring 521 is positioned around the boss 563 on the first guiding surface 101, the first locking element 521 is longitudinally slid over the first spring 521 to retain the first spring 521 in place.

The first locking element 551 comprises first and second ends 566 and 567. A handle portion 568 is disposed adjacent a middle of the locking element 551. The first locking element 551 is slidingly coupled to the second guiding surface 102 on railways 564 to allow the first locking element 551 to slide longitudinally into first and second sliding positions with respect to the first spring 521 and the second guiding surface 102.

Figure 37:
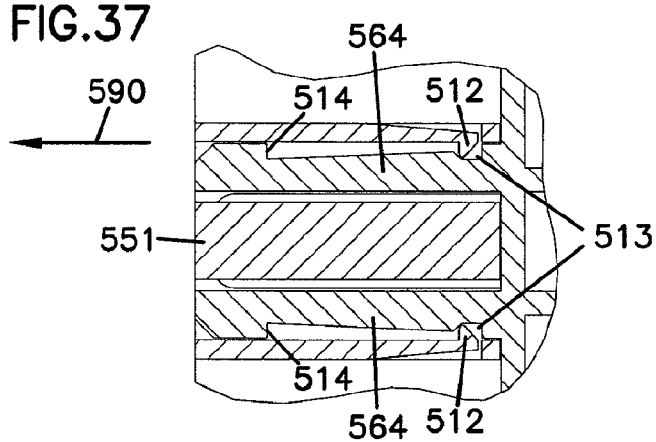
FIGS. 37 and 38 are cross-sectional views taken along line F-F of FIG. 26 showing a portion of the outer side wall portion and the locking element.
Figure 38:
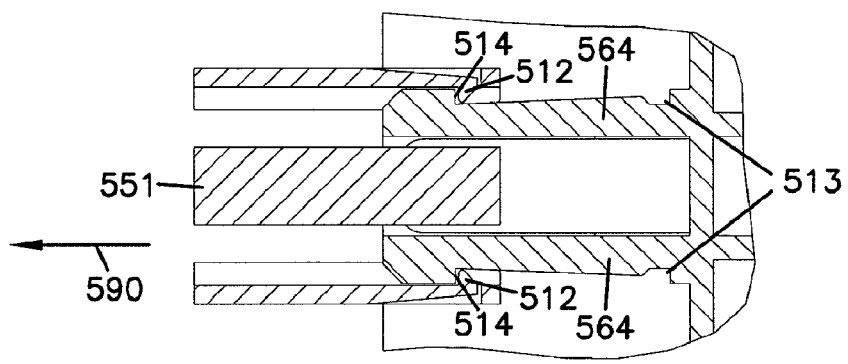

Referring now to FIGS. 33-35, the first locking element 551 includes locking springs 512 disposed on upper and lower surfaces of the locking element 551. The locking springs 512 engage a detent 513 and a stop 514 on the railways 564, as shown in FIGS. 36-38.

In FIG. 36, a portion of the second guiding surface 102 including the railways 564 is shown with the locking element 561 removed. The railways 364 include the detents 513 and the stops 514. As shown in the cross-sections views in FIGS. 37 and 38 taken along line F-F of FIG. 26, the locking springs 512 of the locking element 551 travel along the railways 564 into the first sliding position (FIG. 37), in which the locking springs engage the detents 513 and into the second sliding position (FIG. 38), in which the locking springs engage the stops 514. The stops 514 also prevent the locking element 551 from being slid any further in a direction 590, thereby maintaining the locking element 551 on the railways 564.

Figure 26:
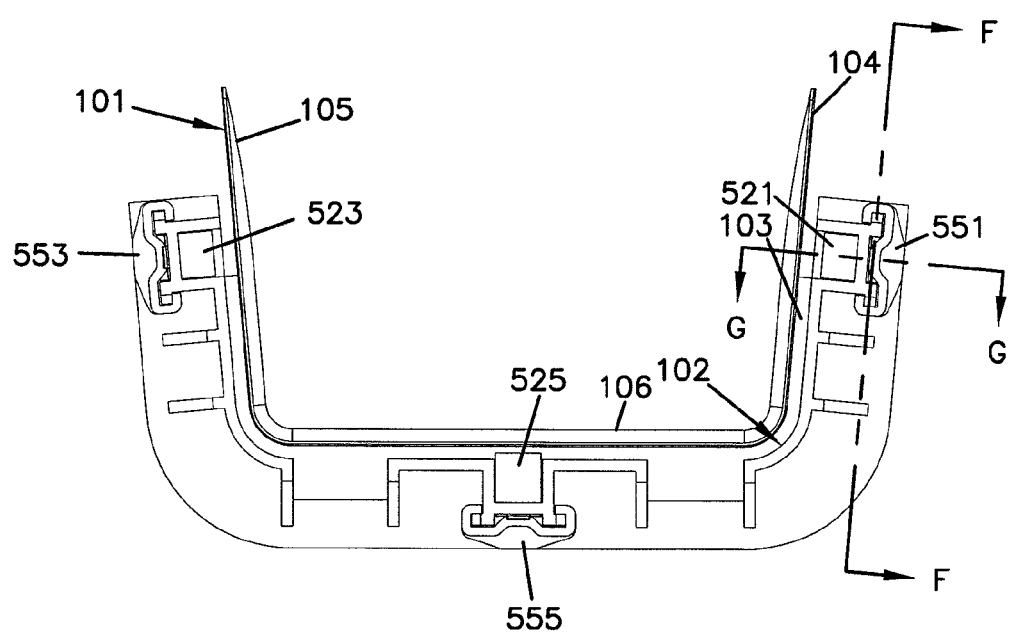
FIGS. 26-29 are front, side, top, and bottom views, respectively, of the coupler shown in FIG. 25.
Figure 27:
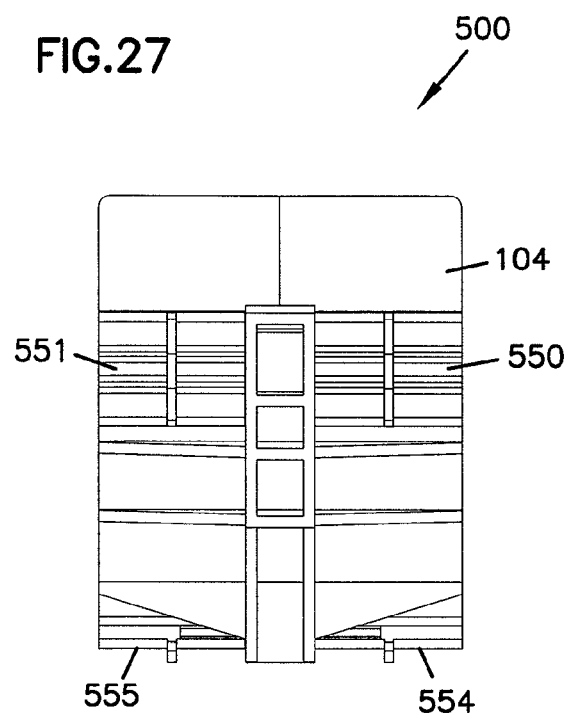
Figure 28:
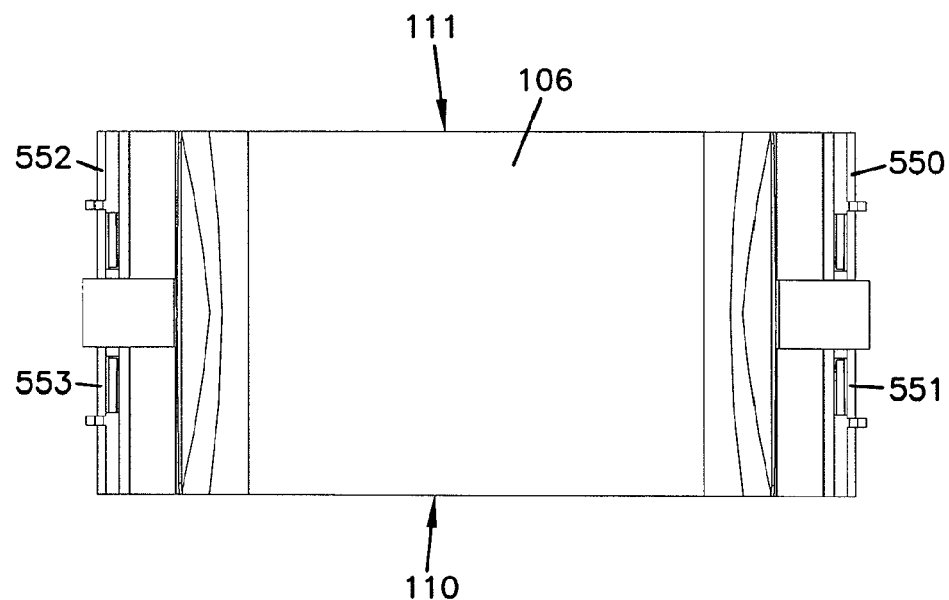
Figure 29:
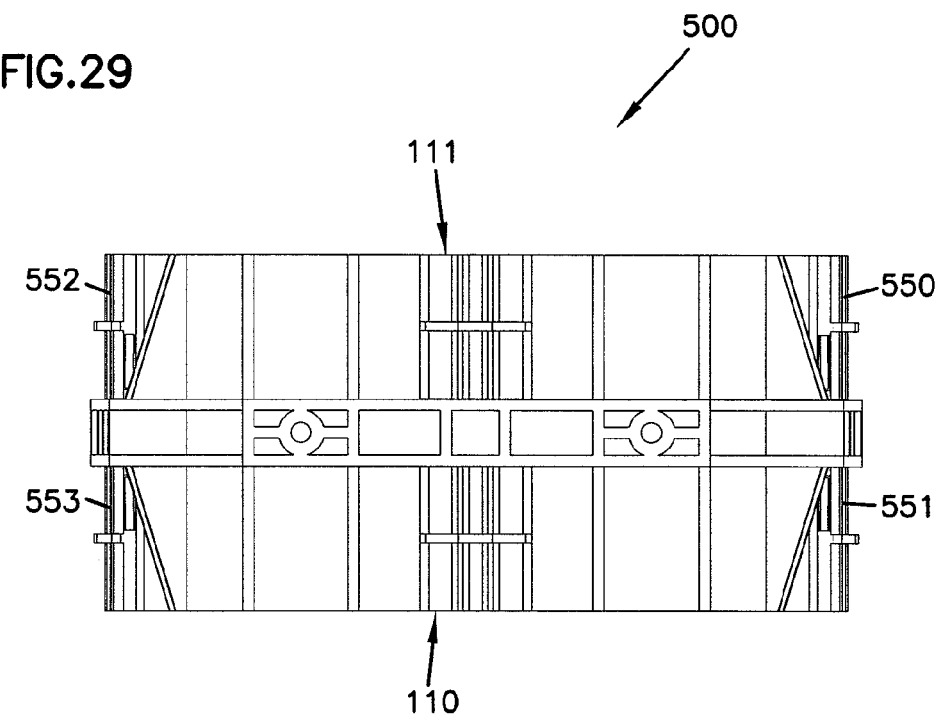
Figure 39:
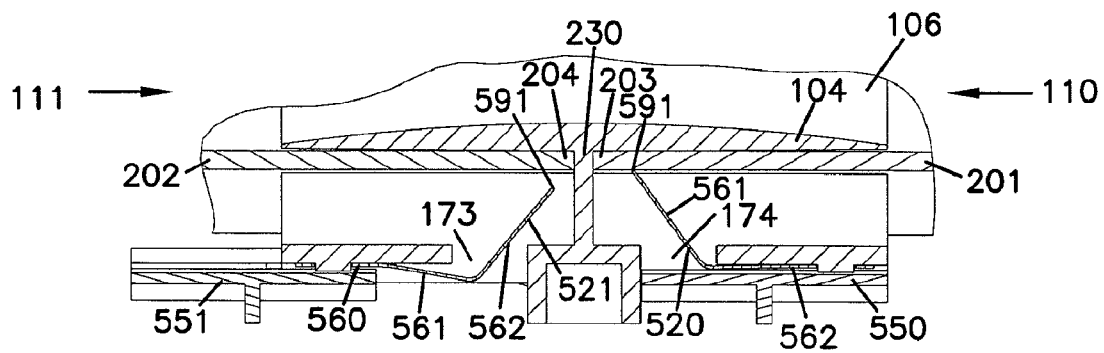
FIG. 39 is a cross-sectional view taken along line G-G of FIG. 26 with trough members installed showing a portion of the outer side wall portion, the locking elements, and the springs.
Figure 40:
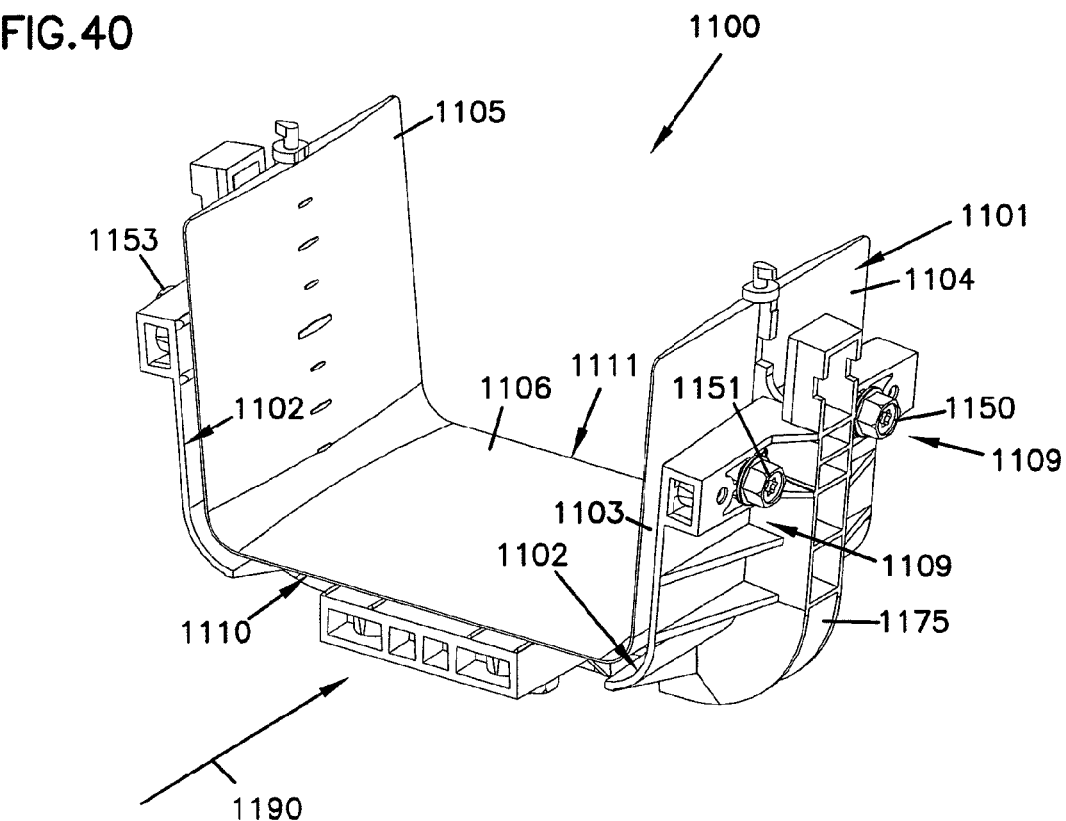
FIG. 40 is a perspective view of another embodiment of a coupler in accordance with the present invention.

A cross-section view in FIG. 39 taken along line G-G of FIG. 26 illustrates the locking elements 520 and 521 with the trough members 201 and 202 inserted into the coupler 500. The locking element 550 is in the first, or locked position so that it covers the aperture 174. The end 591 of the second arm 561 of the spring 550 is pushed through the aperture 174 and towards the first side wall portion 104. In this configuration, the end 591 of the spring 550 engages the trough member 201 to resist pull out of the trough member 201.

The locking element 551 is shown in the second, or unlocked position. The spring 521 is allowed to retract partially through the aperture 173. The end 591 of the spring 521 releases away from the first side wall portion 104, clearing the spacing 103 so that the trough member 202 may be removed.

A method of use for the coupler 500 is similar to that of the coupler 100, except that opposing locking elements can be locked and unlocked independent of each other. For example, if the trough member 201 is to be released from the coupler 500, the locking elements 550, 552, and 554 can be slid from the first, or locked position, to the second, or unlocked position, without moving the locking elements 551, 553, and 555.

Referring now to FIGS. 40-44, another alternative embodiment of a coupler 1100 is provided in accordance with an example embodiment of the present invention. The coupler 1100 includes a first guiding surface 1101 and a second guiding surface 1102 at least partially surrounding the first guiding surface 1101, as well as a first coupler end 1110 and a second coupler end 1111. A spacing 1103 is defined between the first guiding surface 1101 and the second guiding surface 1102. The spacing 1103 is sized to receive a trough member (see trough members 1201 and 1202 in FIGS. 47-51) or other system component inserted into the spacing 1103 in longitudinal direction 1190.

A releasable spring mechanism 1109 releasably mounts the coupler 1100 to a trough member at each end 1110 and 1111. Preferably, the spring mechanism 1109 can be activated or locked during insertion of a trough member end into one of the coupler ends 1110 and 1111. At the desired time, the spring mechanism 1109 is released to allow decoupling of the coupler 1100 and the trough member.

The first guiding surface 1101 of the coupler 1100 is generally U-shaped, including a first side wall portion 1104 and a second side wall portion 1105, as well as a bottom wall portion 1106 joining the first and second side wall portions 1104 and 1105. The second guiding surface 1102 is also U-shaped, includes a midpoint or midsection 1175 dividing the coupler 1100 into first and second halves 1176 and 1177, and generally surrounds at least a portion of the first guiding surface 1101.

First locking elements 1150 and 1151 of the releasable spring mechanism 1109 are positioned adjacent the first side wall portion 1104. In addition, second locking elements 1152 and 1153 are positioned adjacent the second side wall portion 1105. Third locking elements 1154 and 1155, as well as 1156 and 1157, are positioned adjacent the bottom wall portion 1106. The locking elements 1150, 1151, 1152, 1153, 1154, 1155, 1156, and 1157 are illustrated in this preferred embodiment as threaded screws. However, other locking elements may also be used, such as pins or other similar fasteners, without departing from the scope of the invention.

First springs 1120 and 1121 of the releasable spring mechanism 1109 are generally disposed in the second guiding surface 1102 adjacent to the first side wall portion 1104 in the spacing 1103. Similarly, second springs 1122 and 1123 and third springs 1124 and 1125, as well as 1126 and 1127, are positioned adjacent the second side and bottom wall portions 1105 and 1106, respectively. It is not necessary that the entirety of the first, second, or third springs be contained within the spacing 1103. In fact, the entire springs may, but need not, clear the spacing 1103 when in an unlocked position. In a locked position, a portion of the springs may at least partially enter the spacing 1103 to push against a trough member inserted into the spacing 1103. Although only several of the locking elements and springs are described in detail below, it should be understood that all of the locking elements 1150, 1151, 1152, 1153, 1154, 1155, 1156, and 1157, as well as the springs 1120, 1121, 1122, 1123, 1124, 1125, 1126, and 1127, have an identical structure and function in a similar manner.

Figure 45:
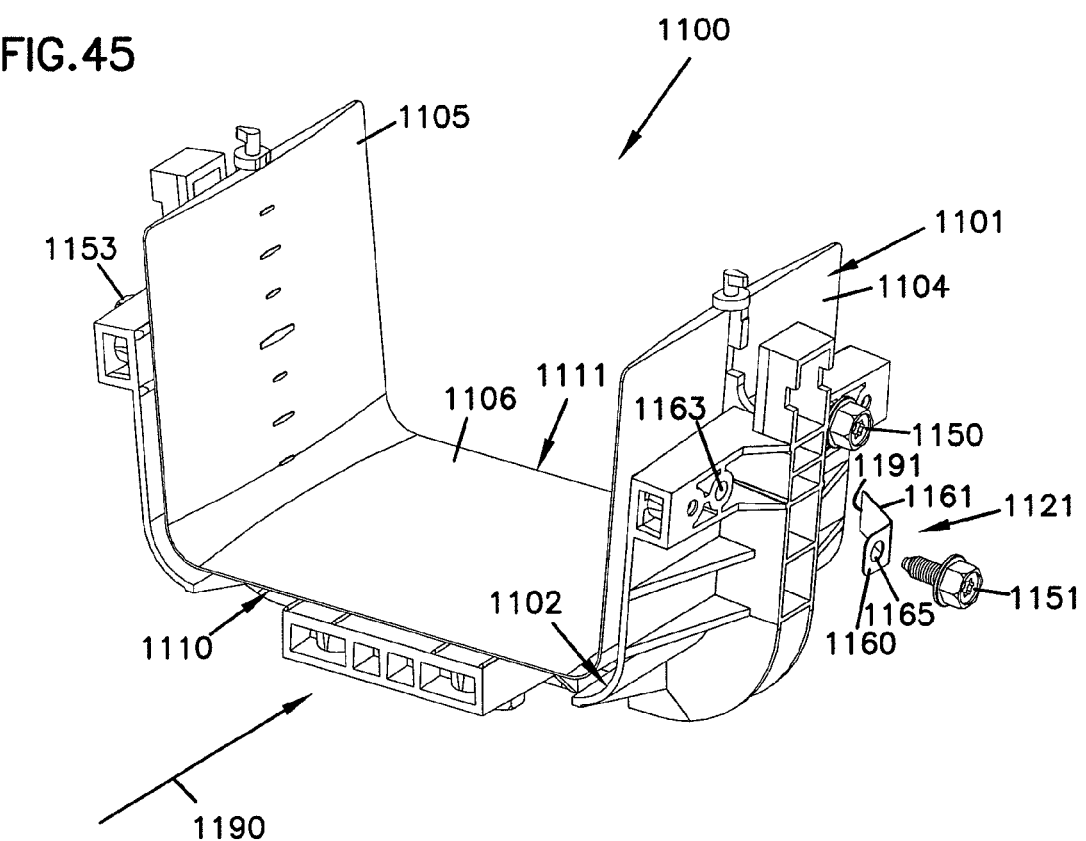
FIG. 45 is a perspective view of the coupler of FIG. 40 with one of the locking elements and springs in exploded view in accordance with the present invention.

As shown with reference to FIG. 45, the first spring 1121 comprises a longitudinal portion 1160 coupled to an arm 1161 with an end 1191. In the example embodiment, the arm 1161 extends from the longitudinal portion 1160 at an angle. In one example, an angle greater than 90 degrees is defined between the longitudinal portion 1160 and the arm 1161. The arm 1161 projects through the spacing 1103 towards the first side wall portion 1104.

The first spring 1160 further defines an aperture 1165 sized to surround and allow the first locking element 1151 to pass through the aperture 1165. The first locking element 1151 is then inserted into an aperture 1163 defined by the second guiding surface 1102. In this configuration, the first locking element 1151 holds the first spring 1121 to the coupler 1100.

Additional springs of differing shapes can also be used without departing from the scope of the invention. For example, the spring 1121 could be formed so that the arm 1161 is positioned at an angle less than 90 degrees with respect to the longitudinal portion 1160. In another embodiment, the longitudinal portions 1160 of the first springs 1120 and 1121 could be formed so that they are joined, thereby creating a single spring unit. Other angles and shapes are also possible to provide the resistance to pull out.

Figure 41:
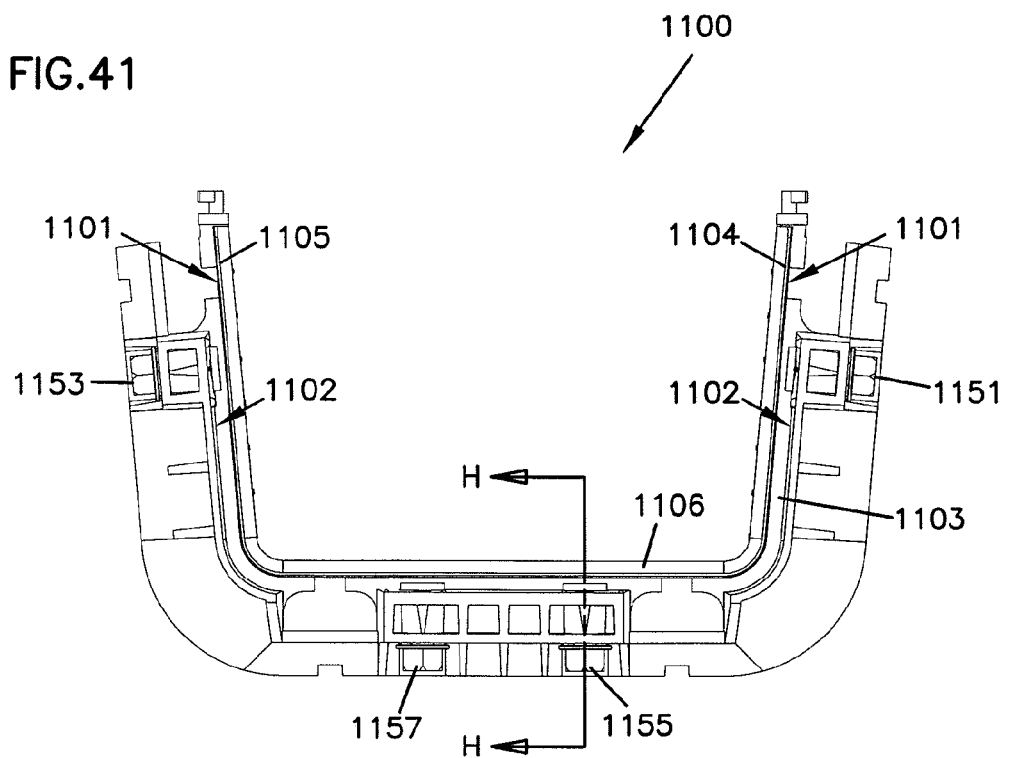
FIGS. 41-44 are front, side, top, and bottom views, respectively, of the coupler shown in FIG. 40.
Figure 42:
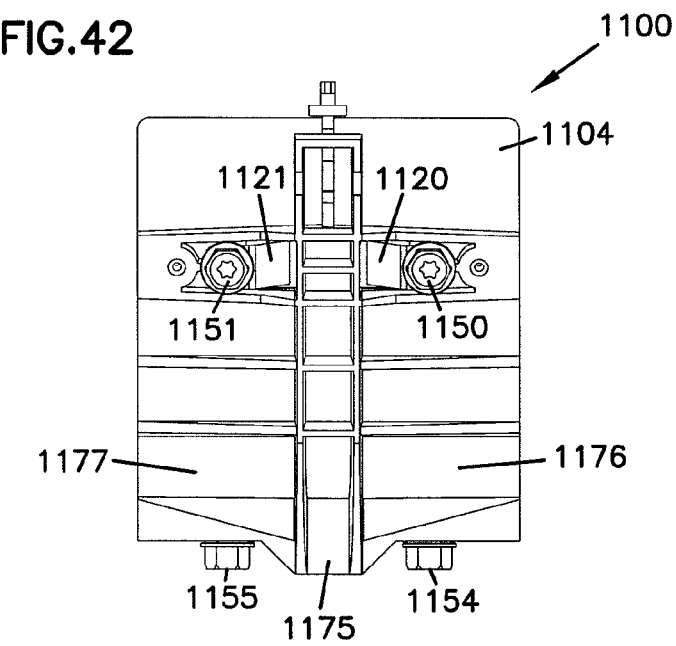
Figure 43:
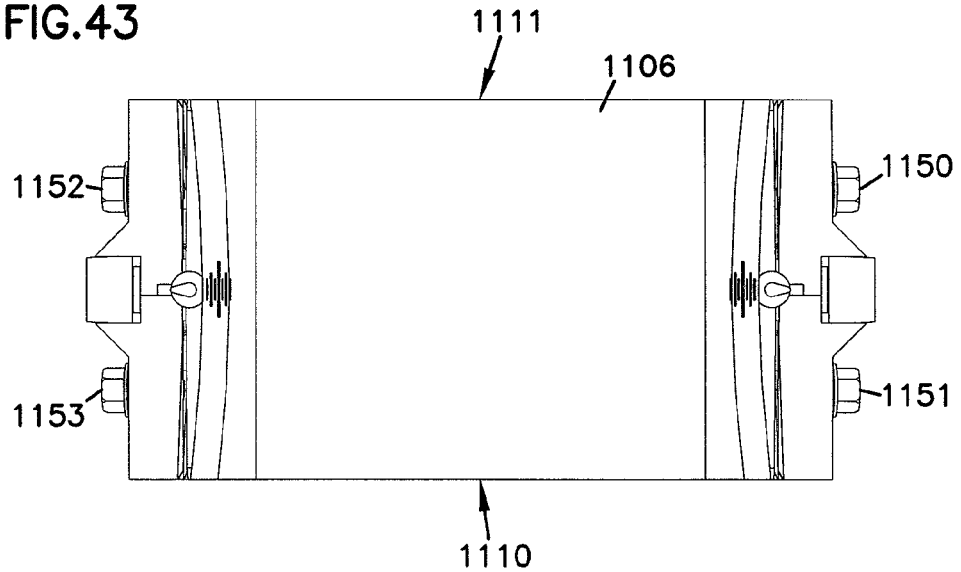
Figure 44:
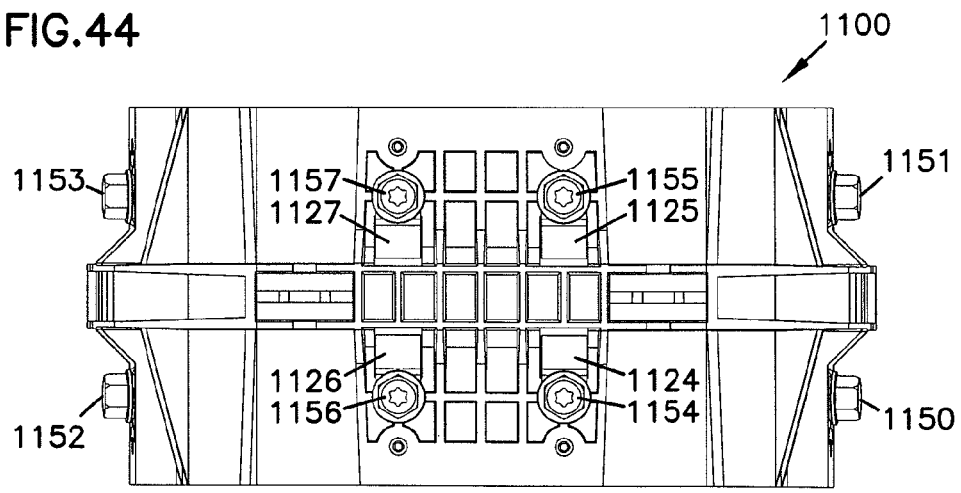
Figure 46:
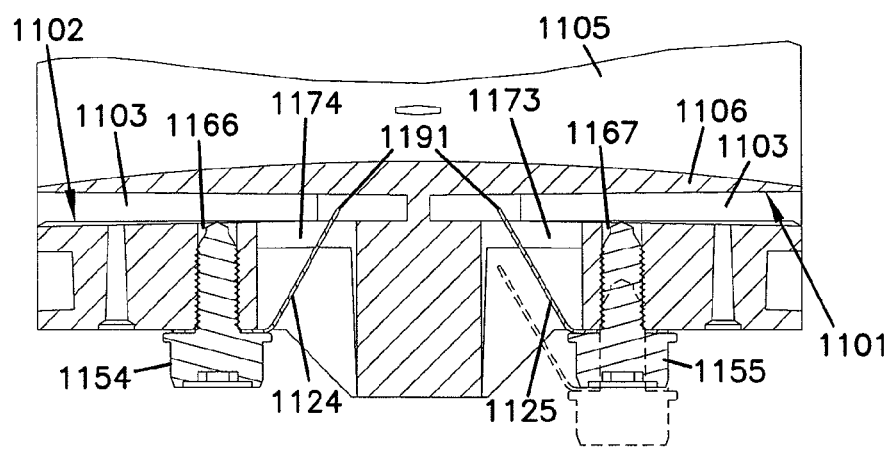
FIG. 46 is a cross-sectional view taken along line H-H of FIG. 41 showing a portion of the coupler with the third locking element and associated springs.
Figure 47:
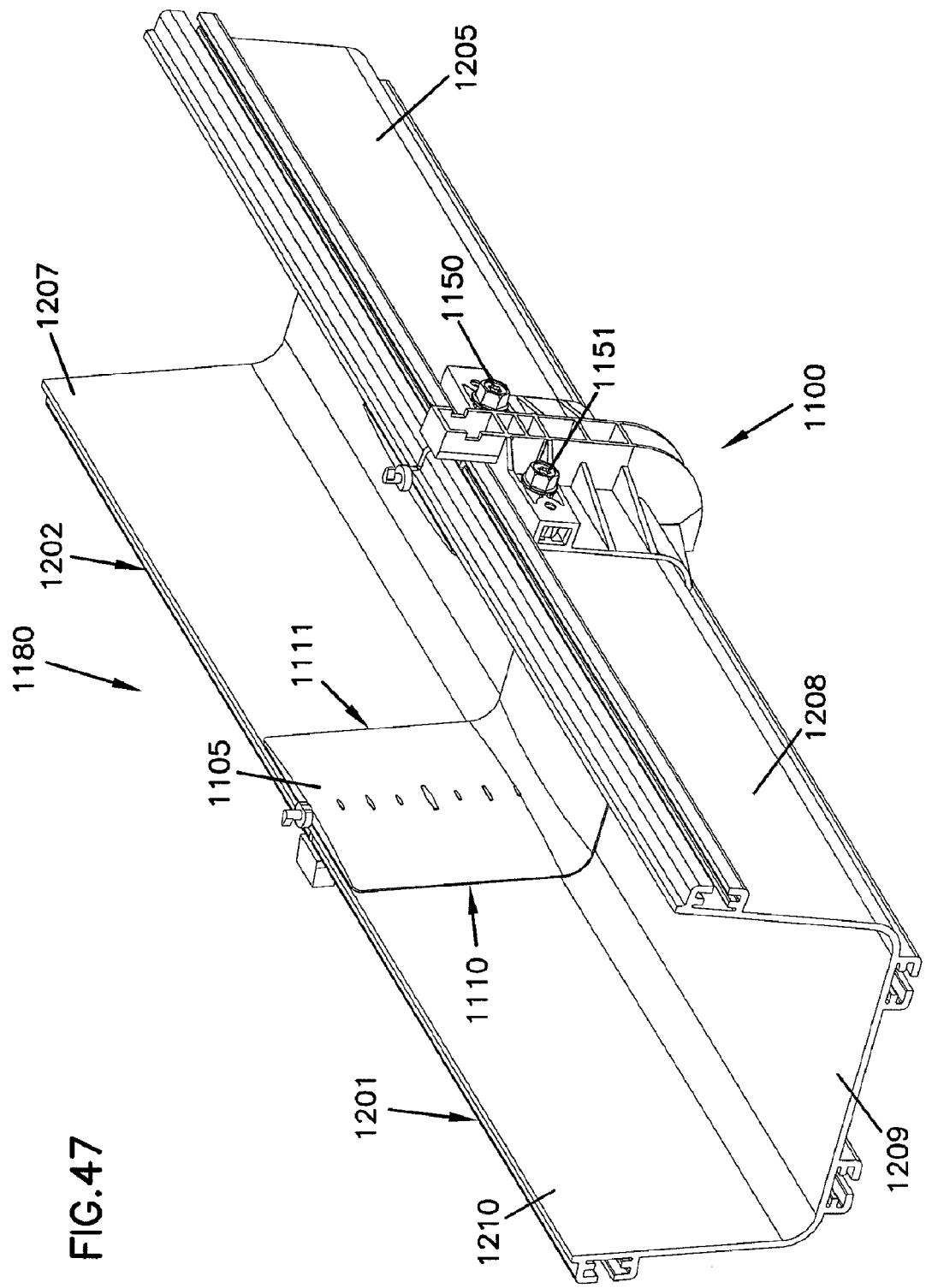
FIG. 47 is a perspective view of the coupler of FIGS. 40-46 and two trough members coupled to the coupler in accordance with the present invention.
Figure 48:
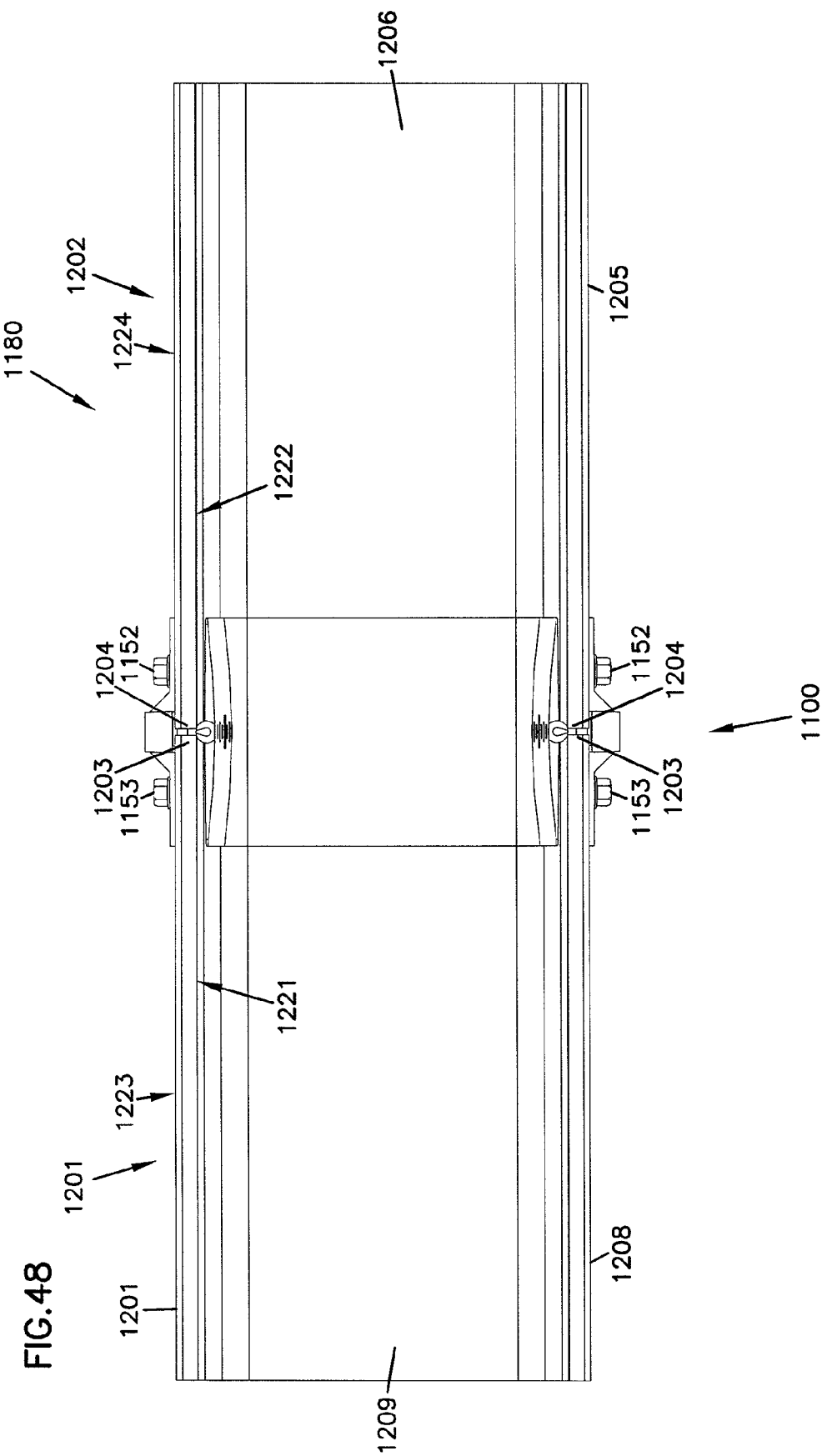
FIGS. 48-50 are top, bottom, and front views, respectively, of the coupler and trough members of FIG. 47.
Figure 49:
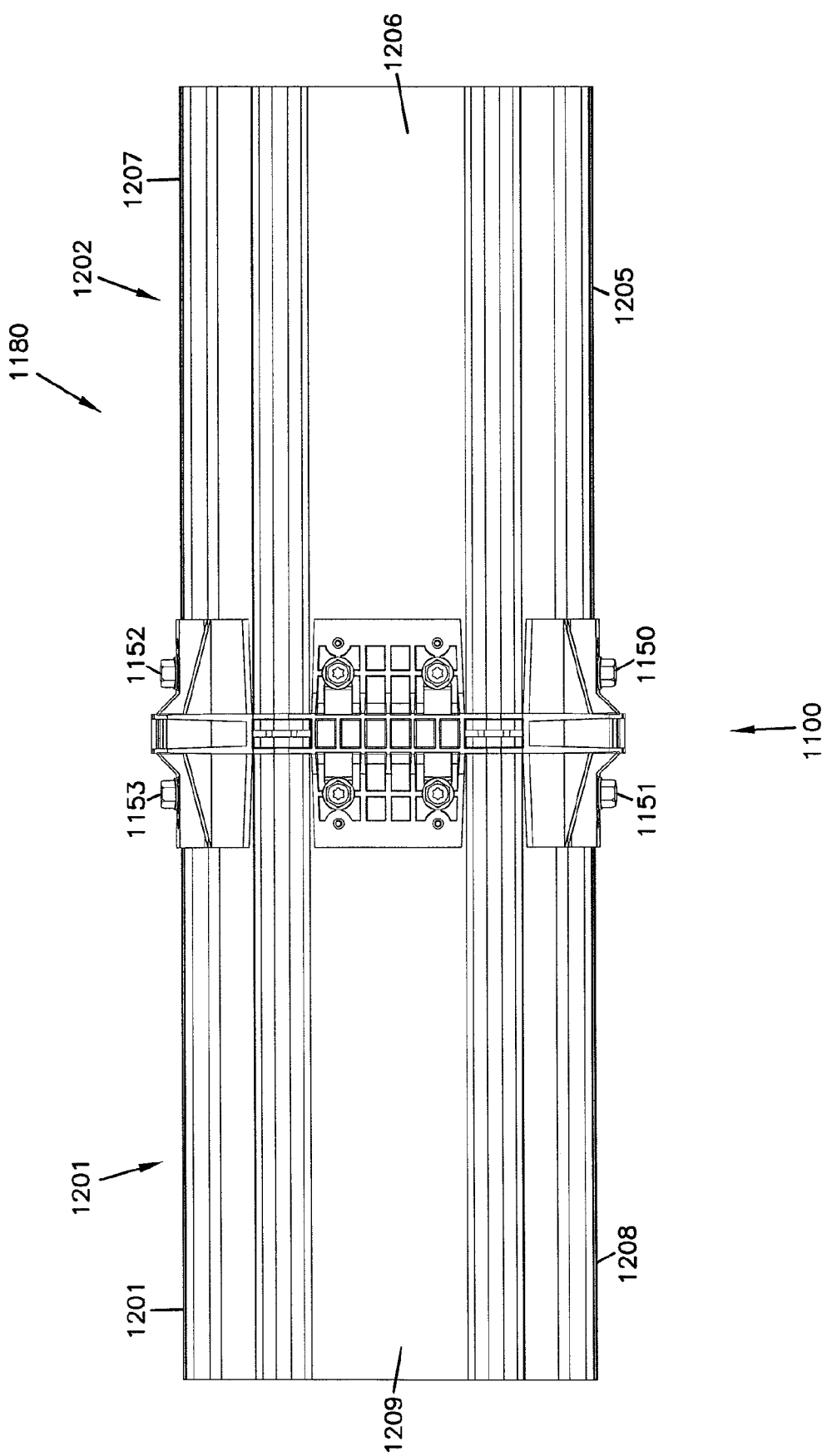

Referring now to FIG. 46, a cross-sectional view taken along line H-H of FIG. 41 is shown. The second guiding surface 1102 defines a first aperture 1173 and a second aperture 1174 adjacent to the third springs 1124 and 1125. The third locking element 1154 is shown threaded into an aperture 1166 formed on the coupler 1100 to hold the spring 1124 in place. The third locking element 1154 is screwed completely into the aperture 1166 until it causes the longitudinal portion 1160 of the spring 1124 to be held against the coupler 1100. This is the locked position.

In the locked position, the arm 1161 of the spring 1124 is pushed towards the bottom wall portion 1106 of the first guiding surface 1101. In this position, the end 1191 of the spring 1124 is projected towards the spacing 1103 to engage a trough member inserted into the spacing 1103 (not shown) and to provide a resistive force against pull out. The end 1191 will engage a trough member inserted into the spacing 1103 and increases the hold down force as the trough member is pulled in a direction away (e.g. opposite 1190) from the coupler 1100.

The third locking element 1155 is shown, in ghost format, partially screwed into the aperture 1167 to hold the spring 1125 in place. Because the locking element 1155, in ghost format, is only partially screwed into the aperture 1167, the locking element 1155 and the spring 1125 are shown in an unlocked, or released position. In the unlocked position, the locking element 1151 is partially released, thereby releasing the spring 1125 to allow the spring 1125 to retract partially back through the second aperture 1174. The other locking elements and springs disposed on the coupler 1100 function in a manner similar to the locking elements 1154 and 1155 and the springs 1124 and 1125.

Referring now to FIGS. 47-51, an embodiment of a trough system 1180 is shown including the coupler 1100 as well as first and second trough members 1201 and 1202 in accordance with the present invention. The first and second trough members 1201 and 1202 are generally U-shaped and comprise, respectively, terminal ends 1203 and 1204, first side walls 1205 and 1208, second side walls 1206 and 1209, bottom walls 1207 and 1210, internal surfaces 1221 and 1222, and external surfaces 1223 and 1224. The trough members 1201 and 1202 can also take the form of other system components, such as T-fittings, downspouts, or elbows, as desired.

As illustrated, the terminal ends 1203 and 1204 of the trough members 1201 and 1202 may be slidingly engaged in the spacing 1103 between the first and second guiding surfaces 1101 and 1102 of the coupler 1100. In other words, the thickness of the walls of each of the trough members 1201 and 1202, or the distance between the inner surfaces 1221 and 1222 and the outer surfaces 1223 and 1224, are sized to fit within the spacing 1103 of the coupler 1100. The coupler 1100 overlaps the terminal ends of each of the trough members to form the coupling.

Figure 50:
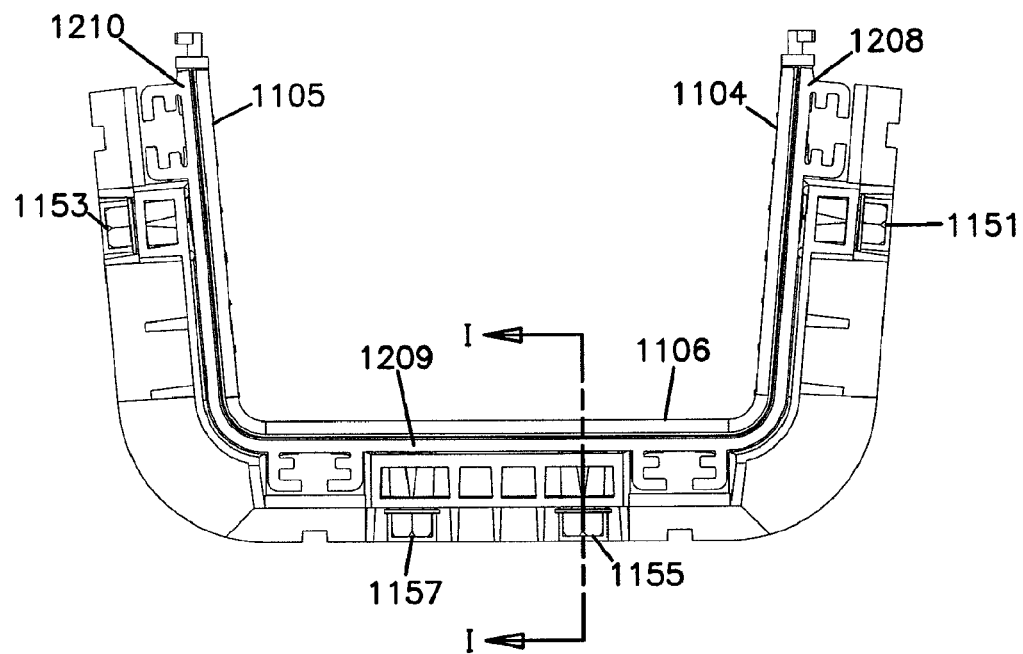
Figure 51:
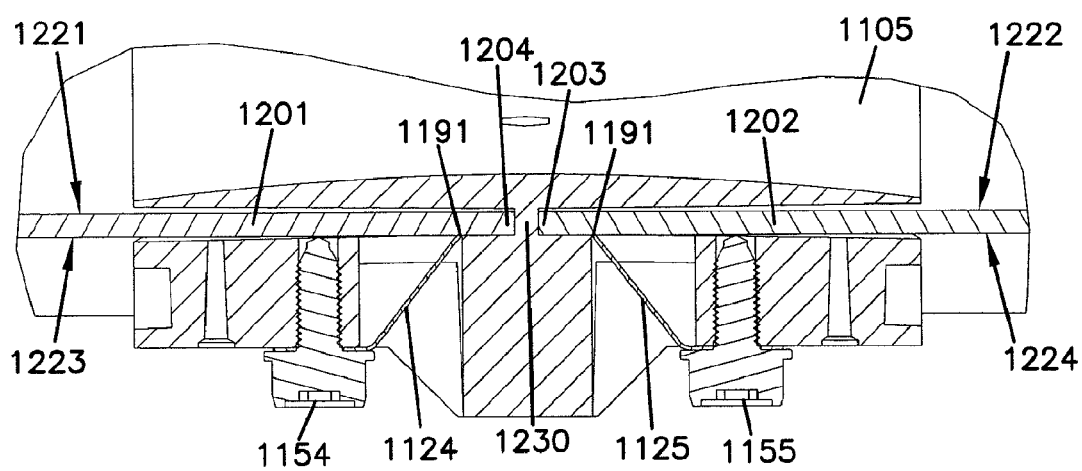
FIG. 51 is a cross-section view taken along line I-I of FIG. 50 showing a portion of the coupler and the trough members with the third locking element and associated springs.

Referring now particularly to the cross-sectional view shown in FIG. 51, taken along line I-I of FIG. 50, the locking elements 1154 and 1155 are shown in the locked position. The end 1191 of the spring 1124 pushes against the external wall surface 1223 of the terminal end 1203 of the first trough member 1201, urging the internal surface 1221 against the first guiding surface 1101 of the coupler 1100. Likewise, with the second trough member 1202 placed within the spacing 1103 on the second coupler end 1111 of the coupler 1100, the end 1191 of the spring 1125 pushes against the external wall surface 1224 of the terminal end 1204 of the second trough member 1202, urging the internal surface 1222 against the first guiding surface 1101 of the coupler 1100. In this manner, the terminal ends 1203 and 1204 of the trough members 1201 and 1202 are retained within the first and second coupler ends 1110 and 1111 of the coupler 1100. The ends 1191 of the springs 1124 and 1125 grip the trough members 1201 and 1202 and resist pull out of the trough members. The ends 1191 may be formed to engage the trough members and slightly dig into the through members, thereby maintaining a greater hold on the trough members.

An example method for coupling one or more trough members to the coupler 1100 in accordance with the present invention is as follows. The locking elements 1150, 1151, 1152, 1153, 1154, 1155, 1156, and 1157 are all positioned in the locked position, so that the springs 1120, 1121, 1122, 1123, 1124, 1125, 1126, and 1127 are all pushed towards the first guiding surface 1101. The ends 1191 of each spring do not interfere with the insertion of the trough members 1201 and 1202 due to their angled shape. The angled shape is angled toward the direction of insertion of the terminal end of the trough member.

With the locking elements 1150, 1152, 1154, and 1156 in the locked position, the terminal end 1203 of the first trough member 1201 is then inserted into the spacing 1103 between the first and second guiding surfaces 1101 and 1102. The terminal end 1203 is inserted until the terminal end 1203 passes the springs 1120, 1122, 1124, and 1126 and abuts a trough stop 1230 disposed within the spacing 1103. In this position, the ends 1191 of the springs 1120, 1122, 1124, and 1126 engage the external wall surface 1223 of the first trough member 1201, thereby pushing the internal wall surface 1222 against the first guiding surface 1101 to lock the first trough member 1201 into the coupler 1100. Pull out is resisted by the angled shape of the arms 1161 and the ends 1191. The second trough member 1202 may be coupled to the second coupler end 1111 of the coupler 1100 in a similar manner.

An example method for removing the first trough member 1201 in accordance with the present invention includes at least partially unscrewing the locking elements 1150, 1152, 1154, and 1156 to the unlocked position to release the springs 1120, 1122, 1124, and 1126 and then removing the terminal end 1203 of the first trough member 1201 from within the spacing 1103 of the coupler 1100. The second trough member 1202 may be removed in a similar fashion.

The couplers 100 500, and 1100 are presented by way of example only, and other configurations are possible. For example, a coupler may be configured to be coupled to more than two trough members, therefore including more than the first and second coupler ends. Further, a greater number of locking elements and/or springs may be presented for each coupler end, or, alternatively, fewer locking elements and/or springs, for example, one may be used.

The above specification, examples and data provide a complete description of the manufacture and of the invention. Since many embodiments of the invention can be made without departing from the spirit and scope of the invention, the invention resides in the claims hereinafter appended.

The invention claimed is:

1. A coupler for a cable trough system, the coupler comprising:
   a first edge portion of a body of the coupler having a terminal end that is sized to slidably receive a terminal end of a trough member; and
   a release mechanism on the body and moveable relative to the body without use of a tool between a locked position and an unlocked position, wherein the release mechanism slides in a longitudinal direction of the body between the locked and unlocked positions;
   wherein in the locked position the trough member is automatically retained within the coupler upon insertion,
   wherein in the unlocked position the trough member is removable from the coupler, and
   wherein the body includes a second terminal end that is sized to receive a second trough member, wherein in the locked position the second trough member is automatically retained within the coupler upon insertion.

2. The coupler according to claim 1, wherein first trough member is removable from the coupler without the use of a tool while the second member is retained within the coupler.

3. The coupler according to claim 1, wherein the release mechanism releases the first trough member independently from the second trough member.

4. The coupler according to claim 1, wherein the coupler retains the release mechanism in the locked position until the release mechanism is moved to the unlocked position by a user.

5. A coupler for a cable trough system, the coupler comprising:
   a body having a first terminal end that is sized to slidably receive a terminal end of a first trough member; and
   a lock assembly on the body having a spring, the spring including an edge portion and being moveable without use of a tool between a locked position and an unlocked position wherein the lock assembly slides in a longitudinal direction of the body between the locked and unlocked positions;
   wherein in the locked position the edge portion engages the terminal end of the first trough member and opposes removal of the first trough member from the coupler,
   wherein in the unlocked position the first trough member is removable from the coupler,
   wherein the coupler retains the lock assembly in the locked position until the lock assembly is moved to the unlocked position by a user, and
   wherein the body includes a second terminal end that is sized to slidably receive a terminal end of a second trough member.

6. The coupler according to claim 5, wherein the spring includes a second edge portion that engages the terminal end of the second trough member and opposes removal of the second trough member when the lock assembly is in the locked position.

7. The coupler according to claim 6, wherein in the unlocked position the spring opposes removal of the second trough member from the coupler.

* * * * *